(12) United States Patent
Gysling et al.

(10) Patent No.: US 7,295,933 B2
(45) Date of Patent: *Nov. 13, 2007

(54) CONFIGURABLE MULTI-FUNCTION FLOW MEASUREMENT APPARATUS HAVING AN ARRAY OF SENSORS

(75) Inventors: Daniel L. Gysling, Glastonbury, CT (US); Alan D. Kersey, South Glastonbury, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/875,856

(22) Filed: Jun. 24, 2004

(65) Prior Publication Data

US 2005/0011283 A1    Jan. 20, 2005

Related U.S. Application Data

(60) Provisional application No. 60/580,081, filed on Jun. 16, 2004, provisional application No. 60/487,765, filed on Jul. 15, 2003, provisional application No. 60/487,678, filed on Jul. 15, 2003.

(51) Int. Cl.
*F02M 1/00* (2006.01)

(52) U.S. Cl. .................. 702/45; 702/50; 702/48; 702/100; 73/861; 73/861.44; 73/204.21

(58) Field of Classification Search .................. 702/45, 702/48, 100, 103, 104, 50; 73/861.42, 861.08, 73/861.44, 49.5, 53.01, 861, 204.21
See application file for complete search history.

(56) References Cited

U.S. PATENT DOCUMENTS 4,445,389 A    5/1984   Potzick et al. ........... 73/861.27

| 4,677,305 A | 6/1987 | Ellinger ..................... 73/290 V |
| 4,896,540 A | 1/1990 | Shakkottai et al. ...... 73/861.02 |
| 5,040,415 A | 8/1991 | Barkhoudarian ......... 73/861.03 |
| 5,083,452 A | 1/1992 | Hope ......................... 73/61 R |

(Continued)

FOREIGN PATENT DOCUMENTS

WO    WO 9900619    1/1999

(Continued)

OTHER PUBLICATIONS

"Noise and Vibration Control Engineering Principles and Applications", Leo L. Beranek and Istvan L. Ver, A. Wiley Interscience Publication, pp. 537-541, Aug. 1992.

(Continued)

*Primary Examiner*—Michael P. Nghiem
*Assistant Examiner*—Hien Vo
(74) *Attorney, Agent, or Firm*—Michael Grillo

(57) ABSTRACT

A configurable multi-function flow measurement apparatus is provided that can selectably function to measure the speed of sound propagating through a fluid flowing within a pipe and/or to measure pressures disturbances (e.g. vortical disturbances or eddies) moving with a fluid to determine respective parameters of the flow propagating through a pipe and detects the health of an industrial process. The configurable flow measurement device can also be selectable to function as a system diagnostic meter that provides a diagnostic signal indicative of the health of the industrial process, namely health of pumps, valves, motors and other devices in an industrial flow loop. The apparatus includes a sensing device that includes an array of strained-based or pressure sensors used to measure the acoustic and convective pressure variations in the flow to determine desired parameters. In response to a remote or local configuration signal, a control logic selects the desired function of the flow measurement apparatus.

42 Claims, 14 Drawing Sheets

U.S. PATENT DOCUMENTS

| | | | |
|---|---|---|---|
| 5,218,197 A | 6/1993 | Carroll | 250/227.19 |
| 5,363,342 A | 11/1994 | Layton et al. | 367/149 |
| 5,398,542 A | 3/1995 | Vasbinder | 73/40.5 |
| 5,524,475 A | 6/1996 | Kolpak et al. | 73/19.03 |
| 5,591,922 A | 1/1997 | Segeral et al. | 73/861.04 |
| 5,741,980 A | 4/1998 | Hill et al. | 73/861.04 |
| 5,770,805 A | 6/1998 | Castel | 73/861.04 |
| 5,770,806 A | 6/1998 | Hiismaki | 73/861.29 |
| 5,835,884 A | 11/1998 | Brown | 73/861.04 |
| 5,845,033 A | 12/1998 | Berthold et al. | 385/12 |
| 5,948,959 A | 9/1999 | Peloquin | 73/1.83 |
| 6,202,494 B1 | 3/2001 | Ricbel et al. | 73/861.29 |
| 6,354,147 B1 | 3/2002 | Gysling et al. | 73/61.79 |
| 6,378,357 B1 | 4/2002 | Han et al. | 73/54.41 |
| 6,435,030 B1 | 8/2002 | Gysling et al. | 73/587 |
| 6,443,226 B1 | 9/2002 | Diener et al. | 166/241.6 |
| 6,450,037 B1 | 9/2002 | McGuinn et al. | 73/705 |
| 6,463,813 B1 | 10/2002 | Gysling | 73/862.59 |
| 6,536,291 B1 | 3/2003 | Gysling et al. | 73/861.42 |
| 6,550,342 B2 | 4/2003 | Croteau | 73/800 |
| 6,558,036 B2 | 5/2003 | Gysling et al. | 374/147 |
| 6,587,798 B2 | 7/2003 | Kersey et al. | 702/50 |
| 6,601,458 B1 | 8/2003 | Gysling et al. | 73/861.04 |
| 6,609,069 B2 | 8/2003 | Gysling | 702/48 |
| 6,691,584 B2 | 2/2004 | Gysling et al. | 73/861.42 |
| 6,698,297 B2 | 3/2004 | Gysling | |
| 6,732,575 B2 | 5/2004 | Gysling et al. | 73/61.79 |
| 6,782,150 B2 | 8/2004 | Davis et al. | 385/12 |
| 6,813,962 B2 | 11/2004 | Gysling et al. | 73/861.26 |
| 6,837,098 B2 | 1/2005 | Gysling et al. | |
| 6,862,920 B2 | 3/2005 | Gysling et al. | |
| 6,868,737 B2 | 3/2005 | Croteau et al. | |
| 6,889,562 B2 | 5/2005 | Gysling et al. | 73/861.42 |
| 6,898,541 B2 | 5/2005 | Gysling et al. | |
| 6,945,095 B2 | 9/2005 | Johansen | 73/61.45 |
| 2002/0095263 A1 | 7/2002 | Gysling et al. | 702/45 |
| 2003/0038231 A1 | 2/2003 | Bryant et al. | |
| 2003/0066359 A1 | 4/2003 | Gysling et al. | 73/861.23 |
| 2003/0089161 A1 | 5/2003 | Gysling | |
| 2004/0016284 A1 | 1/2004 | Gysling et al. | |
| 2004/0069069 A1 | 4/2004 | Gysling et al. | |
| 2004/0074312 A1 | 4/2004 | Gysling | |
| 2004/0167735 A1 | 8/2004 | Rothman et al. | |
| 2004/0194539 A1 | 10/2004 | Gysling | |
| 2004/0210404 A1 | 10/2004 | Gysling et al. | |
| 2004/0226386 A1 | 11/2004 | Gysling et al. | |
| 2004/0231431 A1 | 11/2004 | Sullivan et al. | |
| 2004/0255695 A1 | 12/2004 | Gysling et al. | |
| 2005/0000289 A1 | 1/2005 | Gysling et al. | |
| 2005/0005711 A1 | 1/2005 | Gysling et al. | |
| 2005/0005712 A1 | 1/2005 | Gysling et al. | |
| 2005/0005713 A1 | 1/2005 | Winston et al. | |
| 2005/0011258 A1 | 1/2005 | Gysling et al. | |
| 2005/0011283 A1 | 1/2005 | Gysling et al. | |
| 2005/0011284 A1 | 1/2005 | Gysling et al. | |
| 2005/0012935 A1 | 1/2005 | Kersey | |
| 2005/0033545 A1 | 2/2005 | Gysling | |
| 2005/0039520 A1 | 2/2005 | Davis et al. | |
| 2005/0044929 A1 | 3/2005 | Gysling et al. | |
| 2005/0044966 A1 | 3/2005 | Gysling et al. | |
| 2005/0050956 A1 | 3/2005 | Gysling et al. | |
| 2005/0072216 A1 | 4/2005 | Engel | |
| 2005/0120799 A1 | 6/2005 | Gysling et al. | |
| 2005/0125166 A1 | 6/2005 | Loose et al. | |
| 2005/0125169 A1* | 6/2005 | Loose | 702/45 |
| 2005/0125170 A1* | 6/2005 | Gysling et al. | 702/48 |
| 2005/0159904 A1* | 7/2005 | Loose et al. | 702/45 |
| 2005/0268702 A1 | 12/2005 | Johansen | |

FOREIGN PATENT DOCUMENTS

| | | |
|---|---|---|
| WO | WO 0000793 | 1/2000 |

OTHER PUBLICATIONS

"Two Decades of Array Signal Processing Research", The Parametric Approach, H. Krim and M. Viberg, IEEE Signal Processing Magazine, Jul. 1996, pp. 67-94.

"Development of an array of pressure sensors with PVDF film, Experiments in Fluids 26", Jan. 8, 1999, Springer-Verlag.

Sonar-Based Volumetric Flow Meter For Pulp and Paper Applications—Daniel L. Gysling & Douglas H. Loose—Dec. 13, 2003.

Sonar-Based Volumetric Flow Meter for Chemical and Petrochemical Applications—Daniel L. Gysling & Douglas H. Loose—Feb. 14, 2003.

New Flowmeter Principle—By Walt Boyes—Flow Control Magazine—Oct. 2003 Issue.

SONAR Gets into the Flow—Daniel L. Gysling and Douglas H. Loose—Modern Process—Jan. 2004.

Piezo Film Sensors Technical Manual—Provided by Measurement Specialties, Inc.—Apr. 2, 1999.

"Viscous Attentuation of Acoustic Waves in Suspensions" by R.L. Gibson, Jr. and M.N. Toksoz, 1989 Acoustical Society of America, May 1989, pp. 1925-1934.

\* cited by examiner

CONFIGURABLE MULTI-FUNCTION FLOW MEASUREMENT APPARATUS HAVING AN ARRAY OF SENSORS

CROSS-REFERENCE TO RELATED PATENT APPLICATIONS

This application claims the benefit of U.S. Provisional Patent Application No. 60/487,765 filed Jul. 15, 2003, U.S. Provisional Patent Application No. 60/487,678 filed Jul. 15, 2003, and U.S. Provisional Patent Application No. 60/580,081 filed Jun. 16, 2004. U.S. Provisional Patent Application No. 60/487,765 filed Jul. 15, 2003, U.S. Provisional Patent Application No. 60/487,678 filed Jul. 15, 2003 are incorporated by reference herein in their entirety.

TECHNICAL FIELD

This invention relates to an apparatus for measuring a parameter of a process flow passing within a pipe, and more particularly to a configurable multi-function flow measurement apparatus for processing data signals to measure the speed of sound propagating through the process flow and/or unsteady pressures associated with a parameter that convects with the flow to provide a flow parameter of the process flow and/or a diagnostic signal indicative of the health of the flow process.

BACKGROUND ART

A fluid flow process (flow process) includes any process that involves the flow of fluid through pipes, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or liquid/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture.

Various sensing technologies exist for measuring various physical parameters of single and/or multiphase fluids in an industrial flow process. Such physical parameters include, for example, volumetric flow rate, composition, consistency, density, and mass flow rate.

In certain sensing applications, such as in industrial flow processes, it may be desirable to sense one or many parameters at a particular location throughout the industrial flow process. It may also be desirable to measure different parameters at different times. For example, it may initially be desirable to sense volumetric flow rate at a particular location throughout an industrial flow process when plant first comes on line. Alternatively, it may be desirable to sense different parameters of interest at a later time, such as composition, density, and mass flow rate. It may also be desirable to monitor or diagnose various devices in the flow process, such as valves, pumps and motors.

The various different types of parameters that are measured throughout an industrial processing plant requires separate meters or flow measuring devices for each parameter. As one can appreciate, the need to monitor numerous steps in a process becomes very costly in the operation of the plant. It would be advantageous in the operation of industrial processes to deploy a flow measuring device that is capable of selectably measuring a number of different parameters of a system.

SUMMARY OF THE INVENTION

Objects of the present invention include providing a flow measuring apparatus having a configurable multi-function of measuring the speed of sound propagating through a process flow moving within a pipe and/or unsteady pressures associated with a parameter that convects with the flow to provide a flow parameter of the process flow and/or a diagnostic signal indicative of the health of the flow process.

In one aspect of the present invention, an apparatus is provided for measuring at least one parameter of a process flow flowing within a pipe. The apparatus includes at least two pressure sensors disposed at different axial locations along the pipe. Each of the pressure sensors provides a respective pressure signal indicative of a pressure disturbance within the pipe at a corresponding axial position. A signal processor, responsive to said pressure signals, selectively provides one of a first signal related to a velocity of a pressure field moving with the process flow and a second signal related to a speed of sound propagating through the process flow or both in response to a configuration signal.

The foregoing and other objects, features and advantages of the present invention will become more apparent in light of the following detailed description of exemplary embodiments thereof.

BEST MODE FOR CARRYING OUT THE INVENTION

Figure 1:
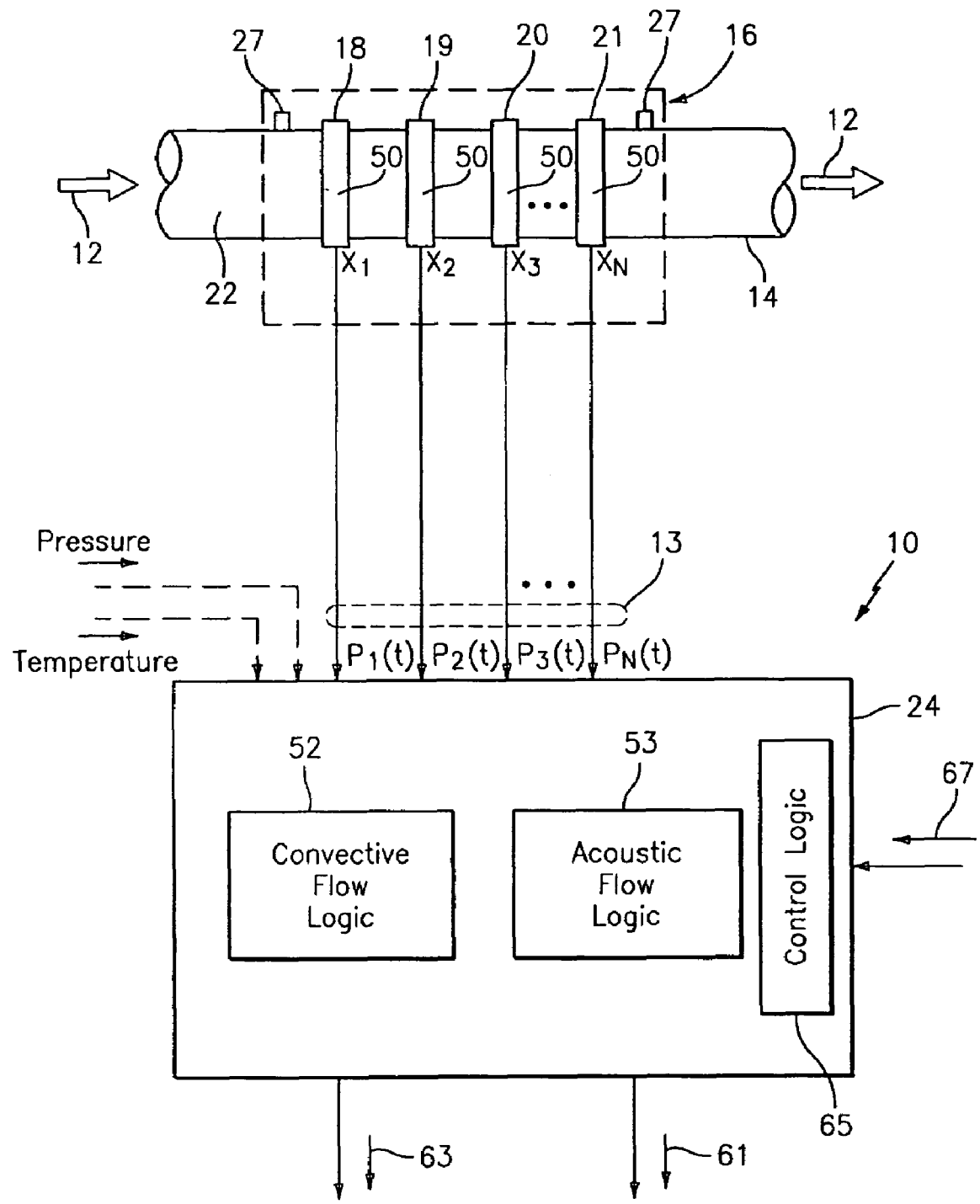
FIG. 1 is a schematic diagram of a flow measurement apparatus having an array of sensors for providing a configurable multi-function in accordance with the present invention.

FIG. 1 illustrates a schematic diagram of a configurable multi-function flow measurement apparatus 10 that includes a sensing device (sensor head) 16 mounted to a pipe 14 and a processing unit (transmitter) 24. The apparatus 10 measures a characteristic or parameter of a single phase fluid (e.g., gas and liquid) and/or multiphase fluids 12 (e.g., gas/liquid mixtures, liquid/solid mixtures, gas/solid mixtures, steam, pulp and paper slurries, and aerated liquids and mixtures) flowing through the pipe 14. Depending on the configuration of the apparatus 10, the flow characteristics and flow parameters that may be determined or provided include the volumetric flow of the fluid, the consistency or composition of the fluid, the density of the fluid, the Mach number of the fluid, the size of particle flowing through the fluid, the air/mass ratio of the fluid, velocity of the flow, volumetric flow rate, gas volume fraction of the flow, the speed of sound propagating through the flow, and/or the percentage of entrained air within a liquid or slurry.

For instance, the apparatus 10, in accordance with the present invention, can determine the speed at which sound propagates through the fluid flow 12 within a pipe 14 to measure particular characteristics of the single or multi-phase fluids. The apparatus may also determine the speed at which pressure disturbances propagate through the pipe 14 to determine the velocity of the fluid flow 12. The pressure disturbances may be in the form of vortical disturbances (e.g., turbulent eddies FIG. 10) or other pressure disturbances that convect (or propagate) with the flow. To simplify the explanation of the present invention, the flow propagating through the pipe will be referred to as a process flow with the understanding that the fluid or process flow 12 may be a single phase or multi-phase flow, as described hereinbefore.

The sensing device 16 comprises an array of strain-based sensors or pressure sensors 18-21 for measuring the unsteady pressures that convect with the flow (e.g., vortical disturbances within the pipe and/or speed of sound propagating through the flow, which are indicative of parameters and/or characteristics of the process flow 12. The pressure signals $P_1(t)$-$P_N(t)$ are provided to the processing unit 24, which digitizes the pressure signals and computes the appropriate flow parameter(s). A cable 13 electronically connects the sensing device 16 to the processing unit 24. The analog pressure sensor signals $P_1(t)$-$P_N(t)$ are typically 4-20 mA current loop signals.

Figure 11:
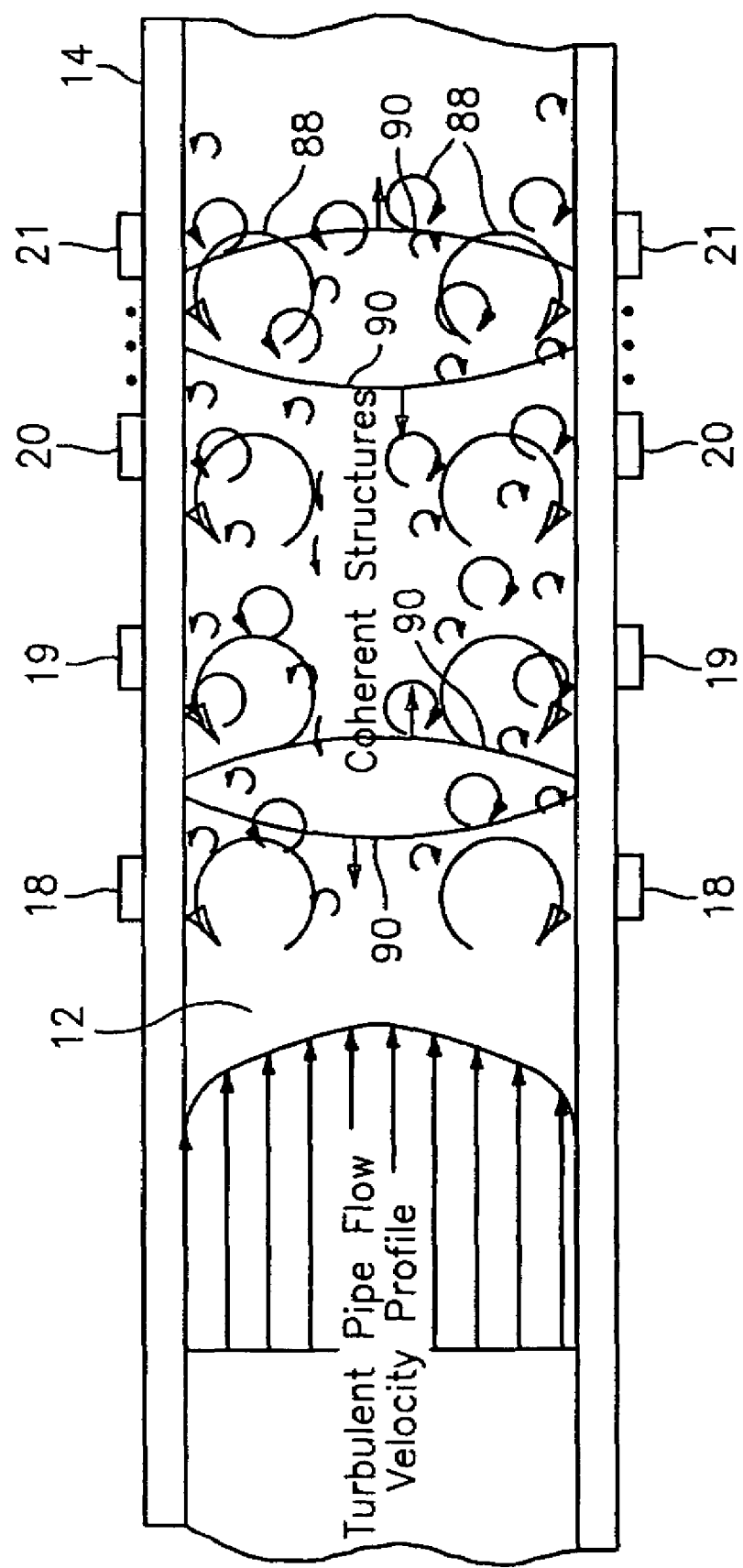
FIG. 11 is a cross-sectional view of a pipe having a turbulent pipe flowing having coherent structures therein, in accordance with the present invention.

The array of at least two strain-based or pressure sensors 18,19, are located at two locations $x_1,x_2$ axially along the pipe 14 for sensing respective stochastic signals propagating between the sensors 18,19 within the pipe at their respective locations. Each sensor 18,19 provides a signal indicating an unsteady pressure at the location of each sensor, at each instant in a series of sampling instants. One will appreciate that the sensor array may include more than two pressure sensors as depicted by pressure sensor 20,21 at location $x_3,x_N$. The pressure generated by the convective pressure disturbances (e.g., eddies 88) and acoustic waves 90 (see FIG. 11) may be measured through strained-based sensors and/or pressure sensors 18-21. The pressure sensors 18-21 provide analog pressure time-varying signals $P_1(t),P_2(t),P_3(t),P_N(t)$ to the signal processing unit 24. The processing unit 24 serially processes the pressure signals to first provide output signals 63 indicative of the pressure disturbances that convect with the flow 12, and subsequently, provide output signals 61 in response to pressure disturbances generated by acoustic waves propagating through the flow 12, as discussed hereinbefore.

The pressure sensors 18-21 may be clamped onto or generally removably mounted to the pipe by any releasable fastener, such as bolts, screws and clamps. Alternatively, the sensors may be permanently attached to or integral (e.g., embedded) with the pipe 14. The array of sensors of the sensing device 16 may include any number of pressure sensors 18-21 greater than two sensors, such as three, four, eight, sixteen or N number of sensors between two and twenty-four sensors. Generally, the accuracy of the measurement improves as the number of sensors in the array increases. The degree of accuracy provided by the greater number of sensors is offset by the increase in complexity and time for computing the desired output parameter of the flow. Therefore, the number of sensors used is dependent at least on the degree of accuracy desired and the desire update rate of the output parameter provided by the apparatus 10.

The pressure sensors 18-19 measure the unsteady pressures produced by acoustic waves propagating through the flow and/or pressure disturbances (e.g., vortical eddies) that convect with the flow within the pipe 14, which are indicative of the SOS propagating through the fluid flow 12 in the pipe and the velocity of disturbances propagating through the flow 12 of the mixture 12, respectively. The processing unit 24 processes the pressure measurement data $P_1(t)$-$P_N(t)$ and determines the desired parameters and characteristics of the flow 12, as described hereinbefore.

The apparatus 10 embodying the present invention, also contemplates providing one or more acoustic sources 27 to enable the measurement of the speed of sound propagating through the flow for instances of acoustically quiet flow. The acoustic source may be a device the taps or vibrates on the wall of the pipe, for example. The acoustic sources may be disposed at the input end of output end of the array of sensors 18-21, or at both ends as shown. One should appreciate that in most instances the acoustics sources are not necessary and the apparatus passively detects the acoustic ridge provided in the flow 12, as will be described in greater detail hereinafter. The passive noise includes noise generated by pumps, valves, motors, and the turbulent mixture itself.

As suggested and further described in greater detail hereinafter, the apparatus 10 has the ability to measure the speed of sound (SOS) and flow rate (or velocity) using one or both of the following techniques described herein below:

1) Determining the speed of sound of acoustical disturbances or sound waves propagating through the flow 12 using the array of pressure sensors 18-21, and/or
2) Determining the velocity of pressure disturbances (e.g., vortical eddies) propagating through the flow 12 using the array of pressure sensors 18-21.

Generally, acoustic flow logic 53 uses the first technique to measure unsteady pressures created by acoustical disturbances propagating through the flow 12 to determine the speed of sound (SOS) propagating through the flow. Knowing the pressure and/or temperature of the flow and the speed of sound of the acoustic disturbances or waves, the processing unit 24 can determine a parameter 61 related to the speed of sound that includes the volumetric flow of the fluid, the consistency or composition of the fluid, the density of the fluid, the Mach number of the fluid, the average size of particles flowing through the fluid, the air/mass ratio of the fluid, and/or the percentage of entrained air within a liquid or slurry, such as that described in U.S. patent application Ser. No. 10/349,716 (CiDRA Docket No. CC-0579), filed Jan. 23, 2003, U.S. patent application Ser. No. 10/376,427 (CiDRA Docket No. CC-0596), filed Feb. 26, 2003, U.S. patent application Ser. No. 10/762,410 (CiDRA Docket No. CC-0703), filed Jan. 21, 2004, which are all incorporated by reference. A more detail description of the acoustic flow logic 53 will described in greater detail hereinafter.

Figure 6:
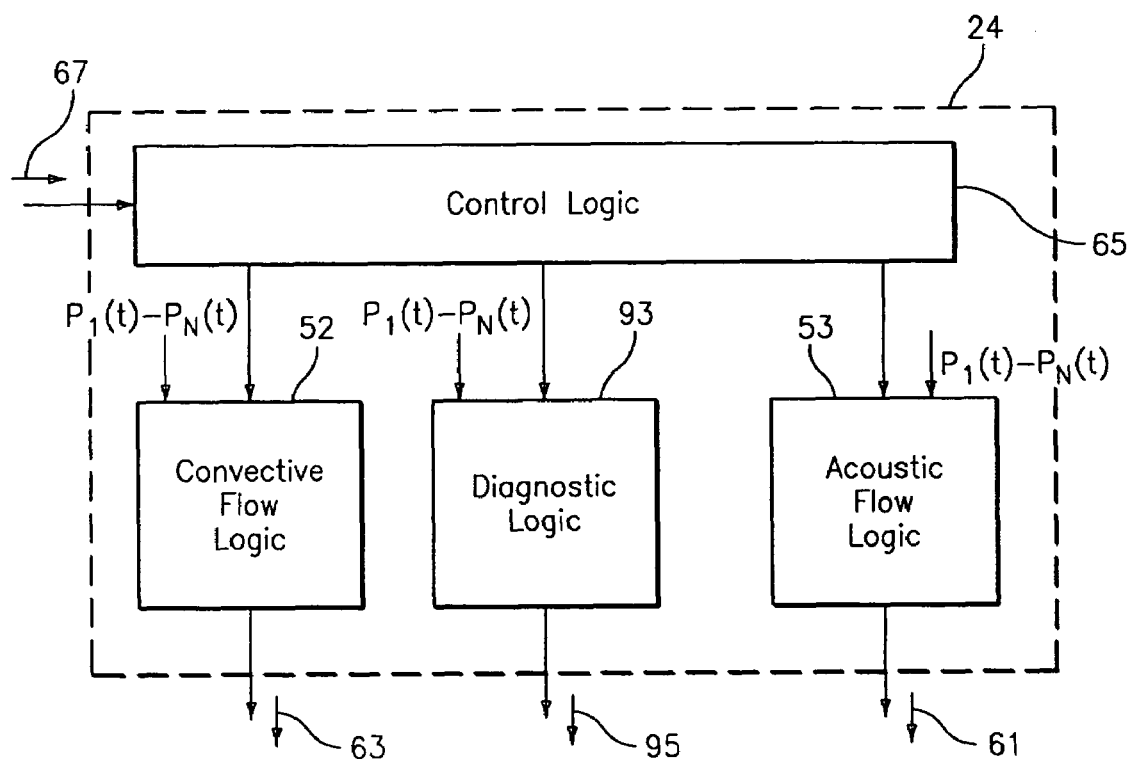
FIG. 6 is a block diagram of another embodiment of a processing unit of the configurable diagnostic and flow measurement apparatus of FIG. 4.

Convective flow logic 52 uses the second technique to measure the velocities associated with unsteady flow fields and/or pressure disturbances, such as that created by vortical disturbances or "eddies" 88 (see FIG. 6), that convect with the process flow 12 to determine the velocity of the process flow. The pressure sensors 18-21 measure the unsteady pressures $P_1$-$P_N$ created by the vortical disturbances 88, for example, as these disturbances convect with the flow 12 through the pipe 14 in a known manner, as shown in FIG. 6. Knowing the velocity of the process flow, the processing unit 24 can determine a parameter 61 related to the velocity, Mach number, and volumetric flow of the process flow. The volumetric flow rate may be determined by multiplying the cross-sectional area of the pipe with the velocity of the flow. A more detail description of the convective flow logic 52 will described in greater detail hereinafter.

Figure 2:
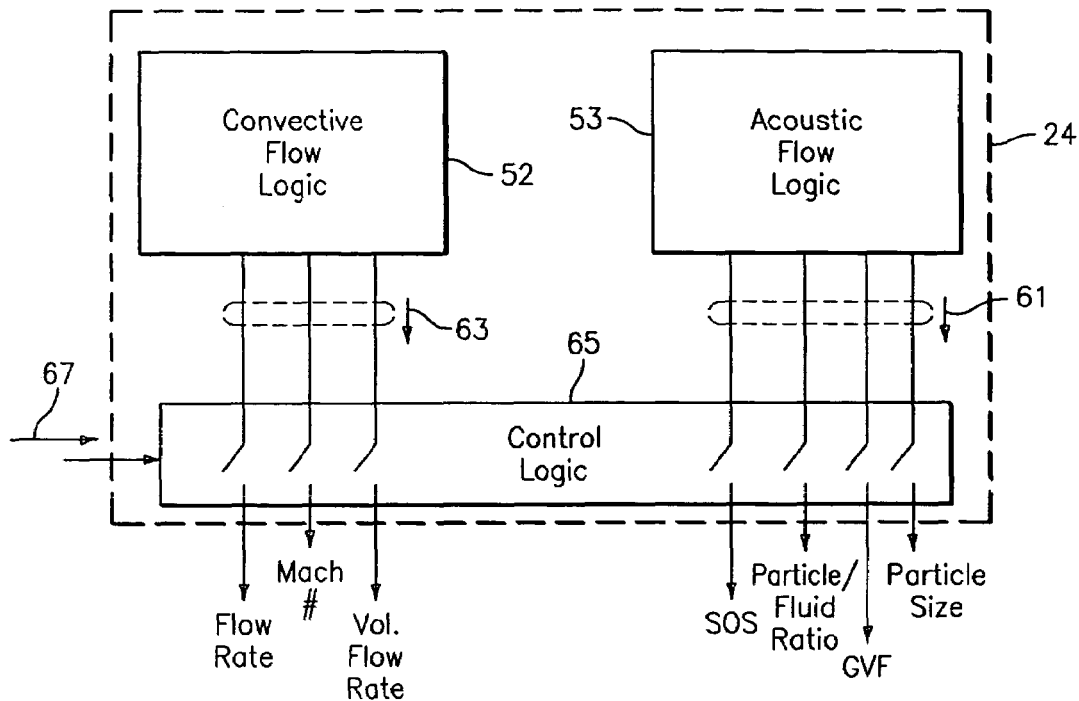
FIG. 2 is a block diagram of a processing unit of the configurable flow measurement apparatus of FIG. 1.
Figure 3:
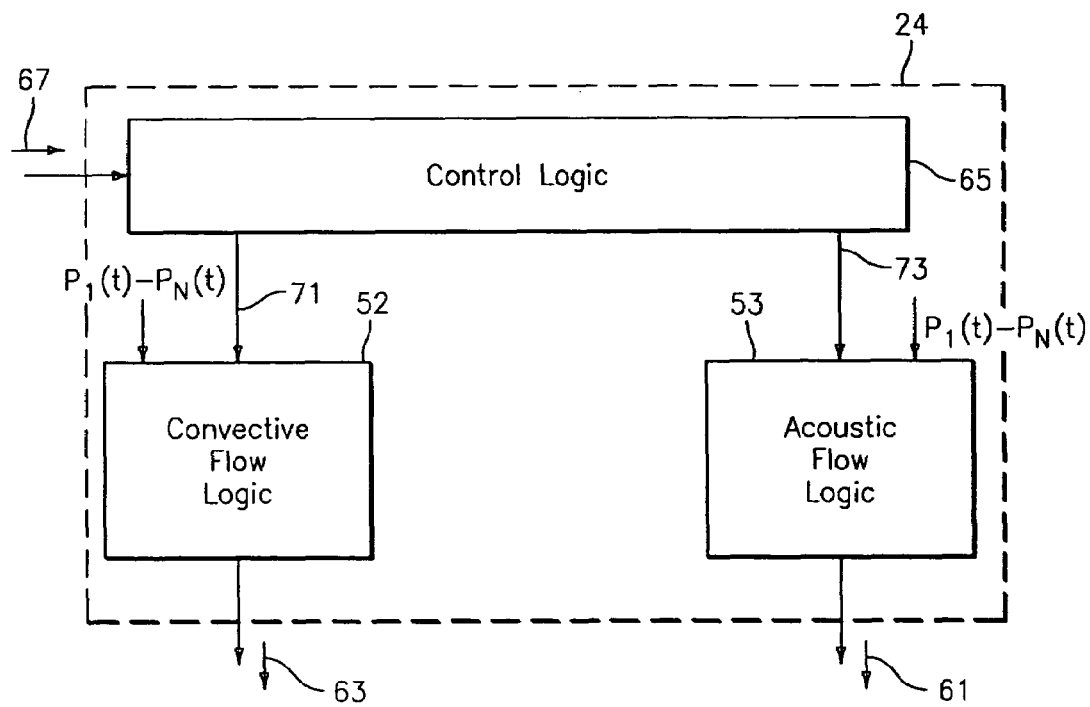
FIG. 3 is a block diagram of another embodiment of a processing unit of the configurable flow measurement apparatus of FIG. 1.

The output signals 61,63 provided by the multi-function apparatus 10 and/or the processing of the input signals $P_1(t)$-$P_N(t)$ by the convective flow logic 52 and acoustic flow logic 53 are controlled or determined by a control logic 65. In response to a configuration signal 67, the control logic 65 outputs the desired measurement signals 61,63. As shown in FIGS. 2 and 3, the control logic can control the outputs of each respective flow logic 52,53 or control which of the flow logics 52,53 is activated. The configuration signal 67 may be provide by a user or DCS remotely or through a local user interface.

In FIG. 2, the control logic simply functions as a switching circuit whereby the control logic receives the output signals 61,63 from both the convective flow logic 52 and the acoustic flow logic 53 and selectively outputs the measured signals of a flow parameter in response to the configuration signal 67. The control logic may function such that each measured parameter is individually selectable or the outputs of each flow logic 52,53 are provided as a group of signals associated with each respective flow logic.

In FIG. 3, the control logic provides a control signal 71,73 to each of convective flow logic 52 and the acoustic flow logic 53, respectively, to activate the selected flow logic. In this instance, in response to the configuration signal, the control logic may provide a control signal 71,73 to the convective flow logic, the acoustic flow logic or both. In response to the control signal 71,73, each respective flow logic 52,53 either processes the input pressure signals $P_1(t)$-$P_N(t)$ or not. Therefore, the convective flow logic or the acoustic flow logic, or both, process the pressure signals and provide respective output signals 61,63. An advantage of this embodiment shown in FIG. 4 is the update rate for the output signals is much faster when only a single control logic 52,53 is selected when compared to the embodiment shown in FIG. 2 when both control logic continually process the input pressure signals $P_1(t)$-$P_N(t)$.

While the apparatus 10 of FIG. 1 contemplates controlling either the processing of the flow logics 52,53 or the switching of the output signals 61,63, one will appreciate that the control logic 65 may control both the processing of the flow logics and the switching of the outputs 61,63.

Figure 4:
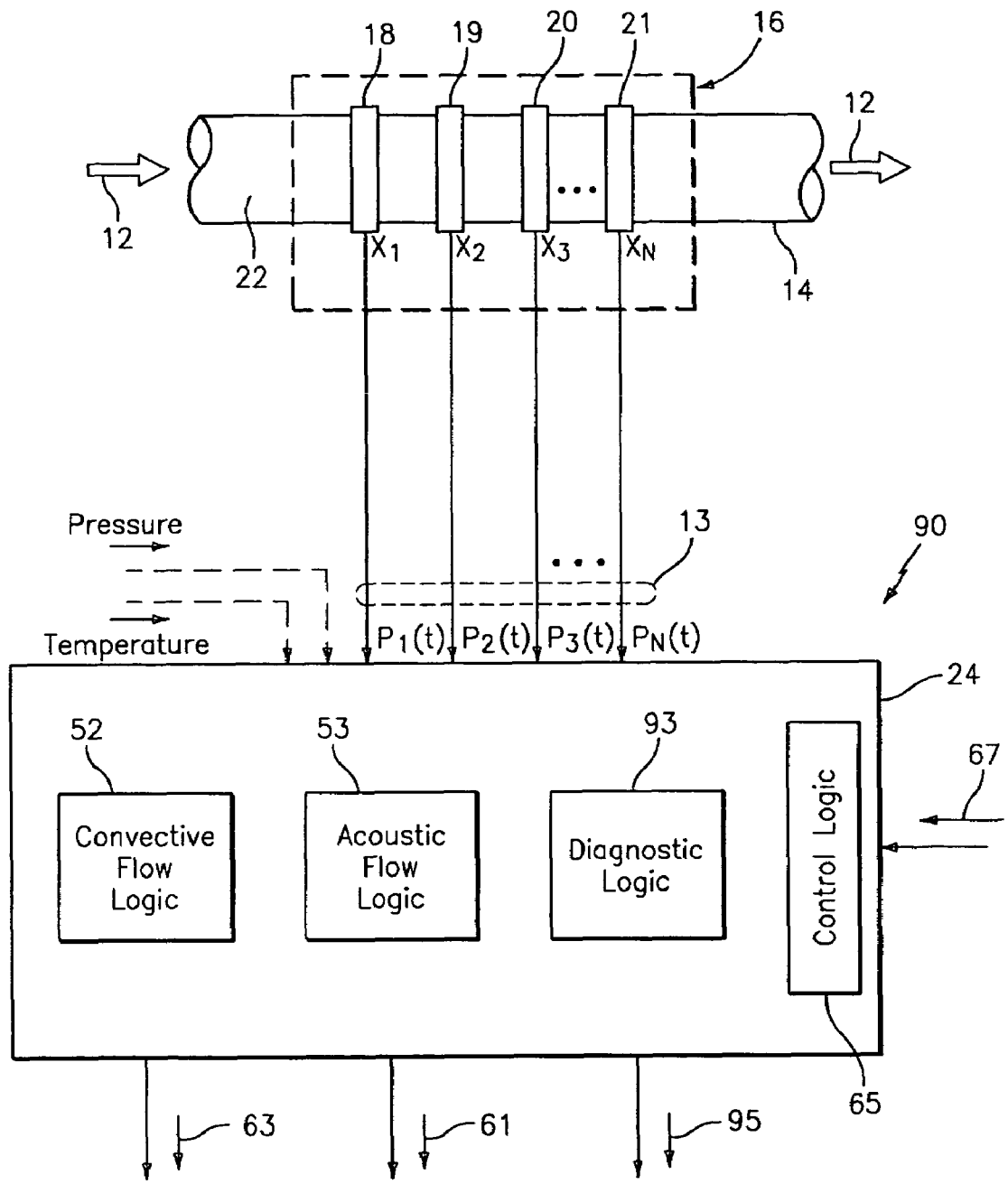
FIG. 4 is a schematic diagram of another embodiment of a diagnostic and flow measurement apparatus having an array of sensors for providing a configurable multi-function in accordance with the present invention.

FIG. 4 illustrates another embodiment of a configurable multi-function flow measurement apparatus 90 similar to the flow apparatus of FIG. 1. The configurable flow measurement apparatus 90 further includes a diagnostic logic 93 that provides a diagnostic signal 95 indicative of the health of the industrial process for which the pipe 14 is a part of. The diagnostic logic is similar to that described in U.S. patent application Ser. No. 10/875,858, filed contemporaneously herewith; and U.S. patent application No. 10/875,859, filed contemporaneously herewith, which are incorporated herein by reference.

The signal processor 24 may apply one or more of the pressure signals $P_1(t)$, $P_2(t)$, $P_3(t)$, $P_4(t)$ and/or the flow signal 63 to diagnose the health of any device that causes unsteady pressures to be generated in the section of the pipe 14 where apparatus 90 is disposed. The diagnosed device may be any machinery, component, or equipment, e.g., motor, fan, pump, generator, engine, gearbox, belt, drive, pulley, hanger, clamp, actuator, valve, meter, or the like. In the embodiment shown, for example, diagnostic logic 93 executed by the signal processor 24 may process the pressure signals $P_1(t)$, $P_2(t)$, $P_3(t)$, $P_4(t)$ and/or the flow signal 63 to diagnose the health of the device. The diagnostic logic 93 may compare the measured data to previously stored data or to parameters input by operating personnel via the operator interface to diagnose or evaluate the changes between the measured and stored or input data. The diagnostic logic 93 provides an output signal 95 indicative of the health of the device, as is described in further detail hereinafter. The signal processor 24 may output the diagnostic signal 95 to an operator interface.

Figure 5:
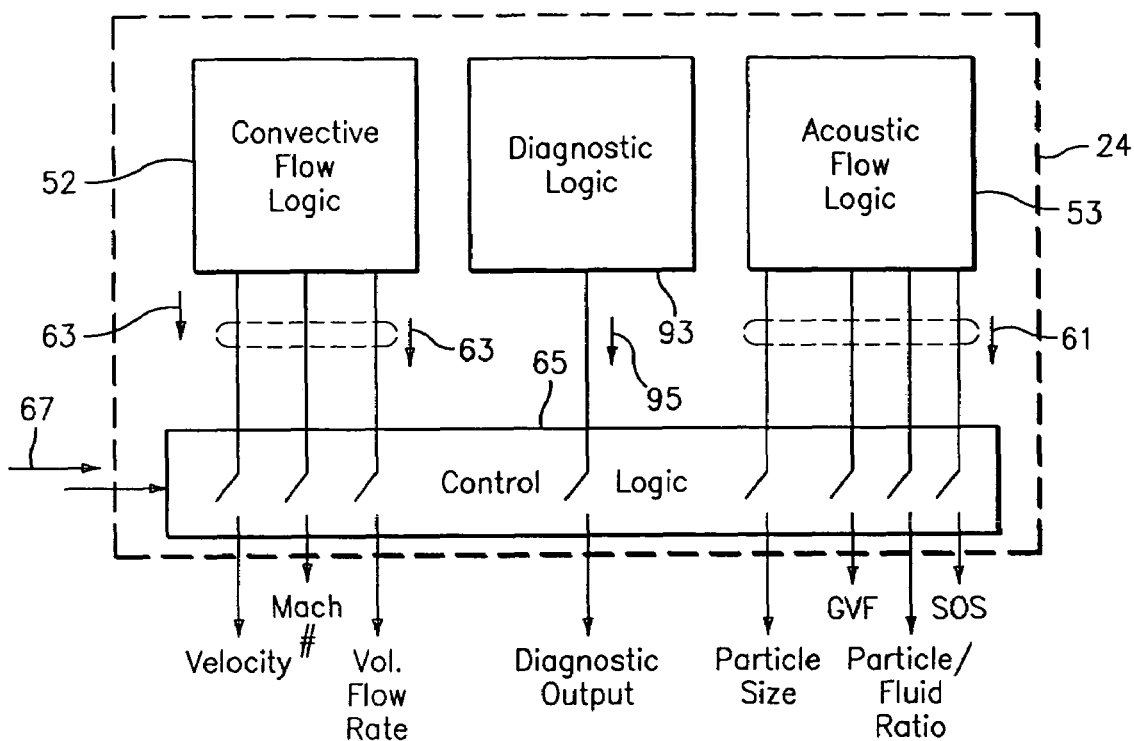
FIG. 5 is a block diagram of a processing unit of the configurable diagnostic and flow measurement apparatus of FIG. 4.

Similarly to that shown in FIGS. 2 and 3, the control logic 65 of the apparatus of FIG. 90 may control the switching of the outputs 61,63,95 of the acoustic flow logic 53, the convective flow logic 52 and the diagnostic logic 93 (as shown in FIG. 5) or control the processing of the convective flow logic 52 and the diagnostic logic 93 (as shown in FIG. 6) or both.

FIGS. 7-10 shows various methods of processing the input pressure sensor signals $P_1(t)$-$P_N(t)$ for the flow measurement apparatus 10,90 of FIGS. 1 and 4 when the configuration signal 67 commands the control logic 65 to activate both the convective flow logic 52 and the acoustic flow logic 53.

Figure 7:
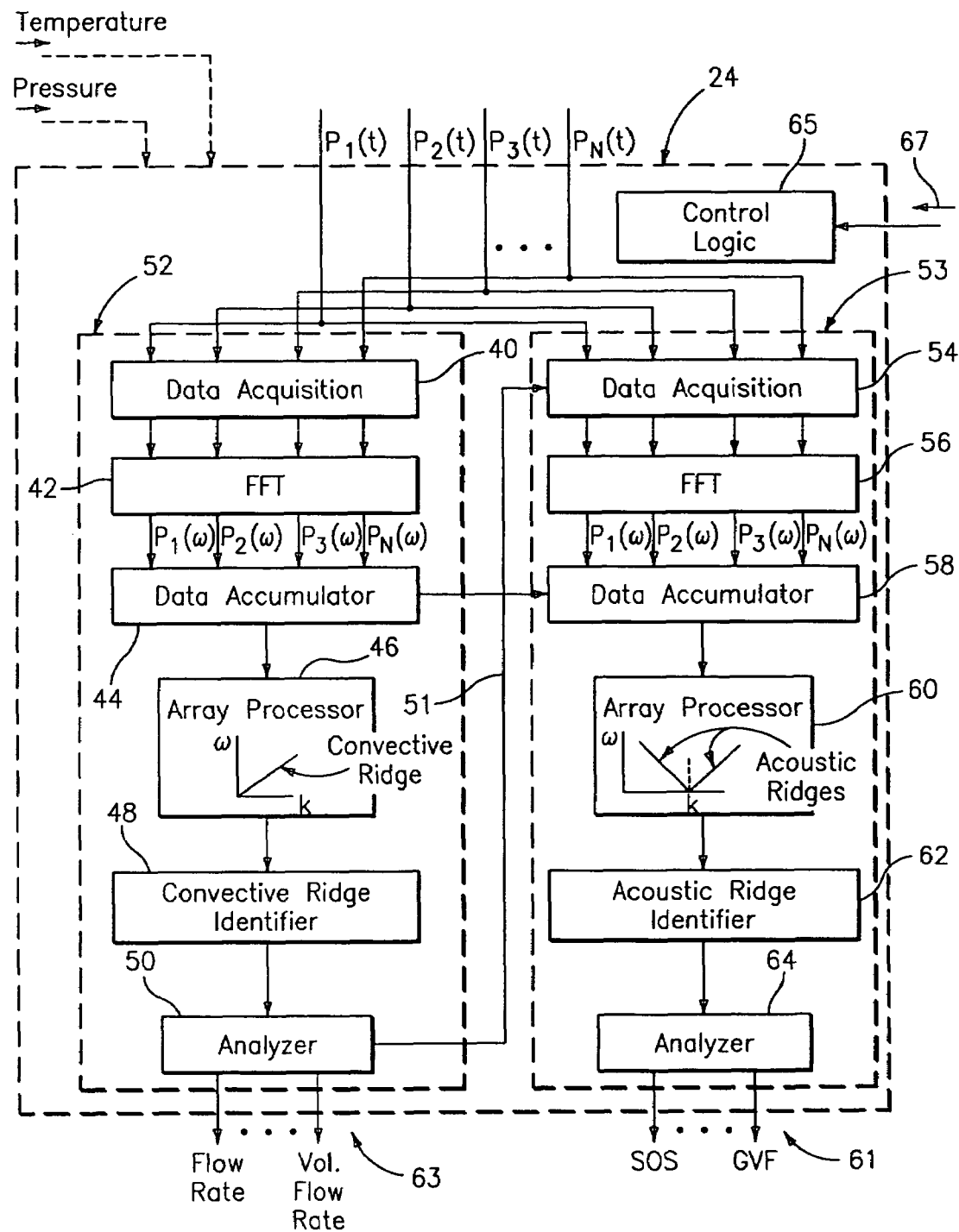
FIG. 7 is a schematic diagram of a processing unit for providing a function using serial processing in accordance with the present invention.

In FIG. 7, the data or pressure signals $P_1(t)$-$P_N(t)$ is processed serially such that the pressure signals are first processed by the convective flow logic 52 and then by the acoustic flow logic 53. In this embodiment, the data is collected or accumulated and processed first by the convective flow logic 52 to provide output signals indicative of the velocity, Mach number and volumetric flow of the process flow. Additional data is then accumulated and processed by the acoustic flow logic 53 to provide output signals indicative of the consistency or composition of the flow, the density of the flow, the average size of particles within the flow, the air/mass ratio of the flow, gas volume fraction of the flow, and/or the speed of sound propagating through the flow. While the apparatus 10 shows the convective pressure disturbance signals are initially processed first, the invention contemplates that the acoustic pressure signals may be initially processed first.

The convective flow logic 52 of the processing unit 24 in FIG. 7 receives the pressure signals from the array of sensors 18-21. A data acquisition unit 40 (e.g., A/D converter) converts the analog signals to respective digital signals. The digitized signals are provided to Fast Fourier Transform (FFT) logic 42. The FFT logic calculates the Fourier transform of the digitized time-based input signals $P_1(t)$-$P_N(t)$ and provide complex frequency domain (or frequency based) signals $P_1(\omega)$, $P_2(\omega)$, $P_3(\omega)$, $P_N(\omega)$ indicative of the frequency content of the input signals. Instead of FFT's, any other technique for obtaining the frequency domain characteristics of the signals $P_1(t)$-$P_N(t)$, may be used. For example, the cross-spectral density and the power spectral density may be used to form a frequency domain transfer functions (or frequency response or ratios) discussed hereinafter.

One technique of determining the convection velocity of the turbulent eddies 88 within the process flow 12 is by characterizing a convective ridge of the resulting unsteady pressures using an array of sensors or other beam forming techniques, similar to that described in U.S. patent application, Ser. No. 10/007,736 and U.S. patent application Ser. No. 09/729,994, filed December 4, 200, now U.S. Pat. No. 6,609,069, which are incorporated herein by reference.

A data accumulator 44 accumulates the frequency signals $P_1(\omega)$-$P_N(\omega)$ over a sampling interval, and provides the data to an array processor 46, which performs a spatial-temporal (two-dimensional) transform of the sensor data, from the xt domain to the k-ω domain, and then calculates the power in the k-ω plane, as represented by a k-ω plot.

The array processor 46 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where λ is the wavelength of a spectral component, and corresponding angular frequencies given by $\omega=2\pi\nu$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Convective characteristics or parameters have a dispersion relationship that can be approximated by the straight-line equation, $$k=\omega/u,$$

where u is the convection velocity (flow velocity). A plot of k-ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 88 is distributed over a range of length scales and hence temporal frequencies.

To calculate the power in the k-ω plane, as represented by a k-ω plot (see FIG. 12) of either the signals, the array processor 46 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensor units 18-21.

The present invention may use temporal and spatial filtering to precondition the signals to effectively filter out the common mode characteristics $P_{common\ mode}$ and other long wavelength (compared to the sensor spacing) characteristics in the pipe 14 by differencing adjacent sensors and retain a substantial portion of the stochastic parameter associated with the flow field and any other short wavelength (compared to the sensor spacing) low frequency stochastic parameters.

Figure 12:
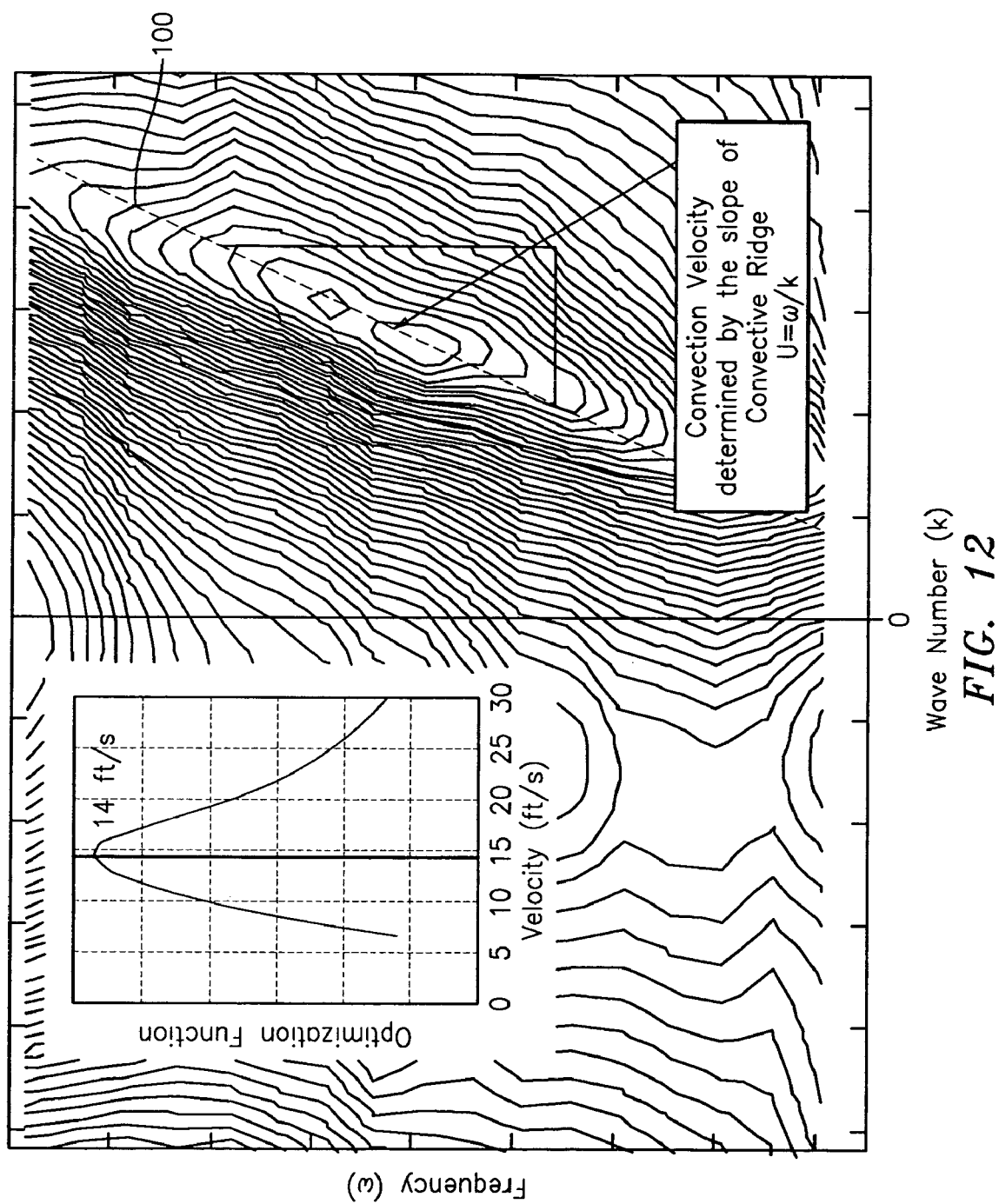
FIG. 12 a kω plot of data processed from an apparatus embodying the present invention that illustrates slope of the convective ridge, and a plot of the optimization function of the convective ridge, in accordance with the present invention.

In the case of suitable turbulent eddies 88 (see FIG. 11) being present, the power in the k-ω plane shown in a k-ω plot of FIG. 12 shows a convective ridge 100. The convective ridge represents the concentration of a stochastic parameter that convects with the flow and is a mathematical manifestation of the relationship between the spatial variations and temporal variations described above. Such a plot will indicate a tendency for k-ω pairs to appear more or less along a line 100 with some slope, the slope indicating the flow velocity.

Once the power in the k-ω plane is determined, a convective ridge identifier 48 uses one or another feature extraction method to determine the location and orientation (slope) of any convective ridge 100 present in the k-ω plane. In one embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 48 provides information about the different trial convection velocities, information referred to generally as convective ridge information.

The analyzer 50 examines the convective ridge information including the convective ridge orientation (slope). Assuming the straight-line dispersion relation given by $k=\omega/u$, the analyzer 50 determines the flow velocity, Mach number and/or volumetric flow. The volumetric flow is determined by multiplying the cross-sectional area of the inside of the pipe with the velocity of the process flow.

After the output signals associated with the convective pressure signals are determined, the processing unit 24 then determines the output signals 63 associated with the speed of sound propagating through the flow 12, as indicated by connecting arrow 51. A second data acquisition unit 54 digitizes additional pressure signals $P_1(t)$-$P_N(t)$ associated with the acoustic waves 14 propagating through the pipe 14. Similarly to the FFT logic 42, an FFT logic 56 calculates the Fourier transform of the digitized time-based input signals $P_1(t)$-$P_N(t)$ and provide complex frequency domain (or frequency based) signals $P_1(\omega)$, $P_2(\omega)$, $P_3(\omega)$, $P_N(\omega)$ indicative of the frequency content of the input signals.

A second data accumulator 58 accumulates the additional signals $P_1(t)$-$P_N(t)$ from the sensors, and provides the data accumulated over a sampling interval to an array processor 60, which performs a spatial-temporal (two-dimensional) transform of the sensor data, from the xt domain to the k-$\omega$ domain, and then calculates the power in the k-$\omega$ plane, as represented by a k-$\omega$ plot, similar to that provided by the convective array processor 46.

To calculate the power in the k-$\omega$ plane, as represented by a k-$\omega$ plot (see FIG. 13) of either the signals or the differenced signals, the array processor 60 determines the wavelength and so the (spatial) wavenumber k, and also the (temporal) frequency and so the angular frequency $\omega$, of various of the spectral components of the stochastic parameter. There are numerous algorithms available in the public domain to perform the spatial/temporal decomposition of arrays of sensor units 18-21.

Figure 13:
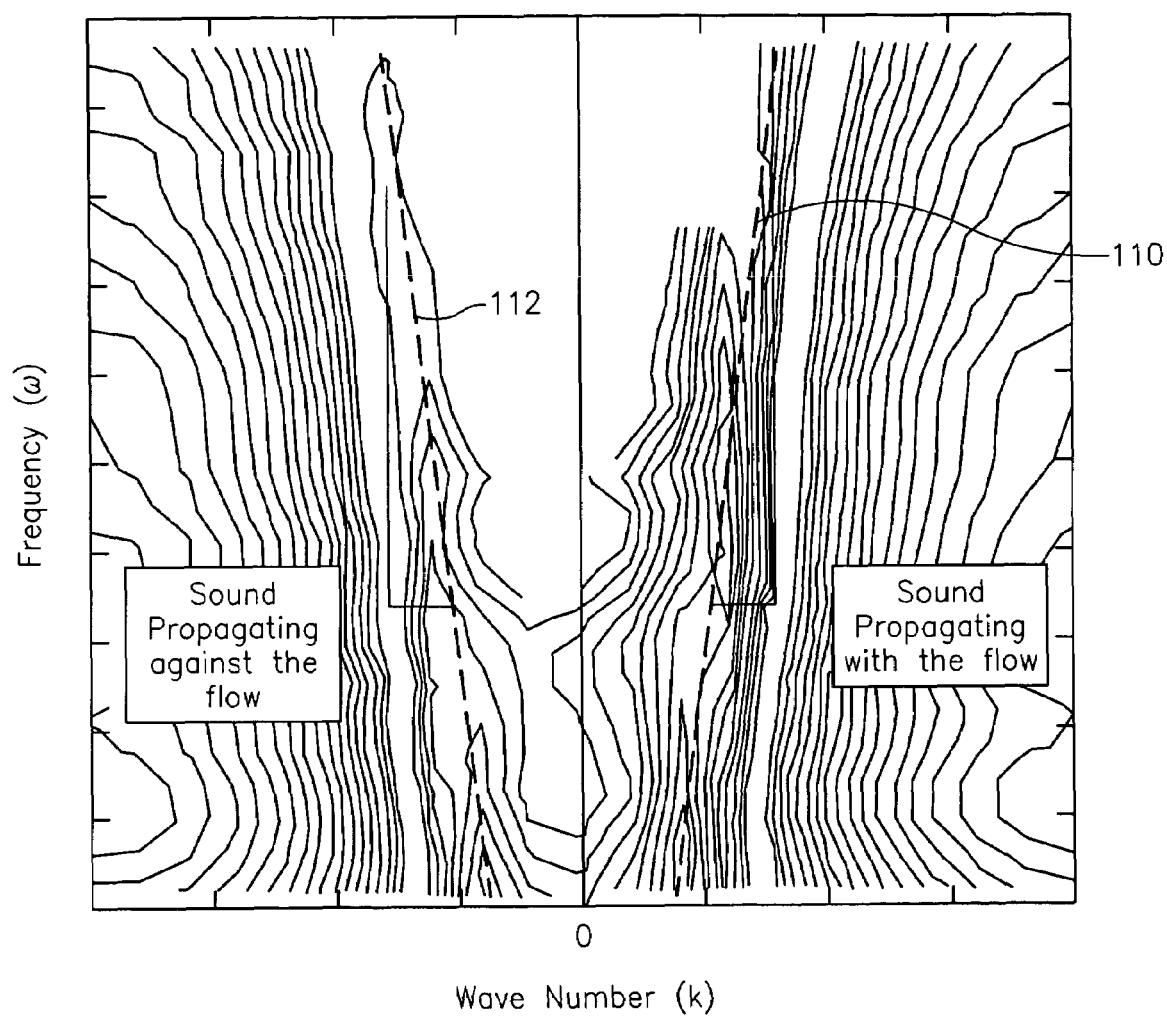
FIG. 13 a kω plot of data processed from an apparatus embodying the present invention that illustrates slope of the acoustic ridges, in accordance with the present invention.

In the case of suitable acoustic waves 90 being present in both axial directions, the power in the k-$\omega$ plane shown in a k-(o plot of FIG. 13 so determined will exhibit a structure that is called an acoustic ridge 110,112 in both the left and right planes of the plot, wherein one of the acoustic ridges 110 is indicative of the speed of sound traveling in one axial direction and the other acoustic ridge 112 being indicative of the speed of sound traveling in the other axial direction.

The acoustic ridges represent the concentration of a stochastic parameter that propagates through the flow and is a mathematical manifestation of the relationship between the spatial variations and temporal variations described above. Such a plot will indicate a tendency for k-$\omega$ pairs to appear more or less along a line 110,112 with some slope, the slope indicating the speed of sound. The power in the k-$\omega$ plane so determined is then provided to an acoustic ridge identifier 62, which uses one or another feature extraction method to determine the location and orientation (slope) of any acoustic ridge present in the left and right k-$\omega$ plane. The velocity may be determined by using the slope of one of the two acoustic ridges 110,112 or averaging the slopes of the acoustic ridges 110,112.

Finally, information including the acoustic ridge orientation (slope) is used by an analyzer 64 to determine the flow parameters 61 relating to measured speed of sound, such as the consistency or composition of the flow, the density of the flow, the average size of particles in the flow, the air/mass ratio of the flow, gas volume fraction of the flow, the speed of sound propagating through the flow, and/or the percentage of entrained air within the flow.

Similar to the array processor 46, the array processor 60 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

One such technique of determining the speed of sound propagating through the flow 12 is using array processing techniques to define an acoustic ridge in the k-$\omega$ plane as shown in FIG. 13. The slope of the acoustic ridge is indicative of the speed of sound propagating through the flow 12. The speed of sound (SOS) is determined by applying sonar arraying processing techniques to determine the speed at which the one dimensional acoustic waves propagate past the axial array of unsteady pressure measurements distributed along the pipe 14.

The apparatus 10 of the present invention measures the speed of sound (SOS) of one-dimensional sound waves propagating through the mixture to determine the gas volume fraction of the mixture. It is known that sound propagates through various mediums at various speeds in such fields as SONAR and RADAR fields. The speed of sound propagating through the pipe and flow 12 may be determined using a number of known techniques, such as those set forth in U.S. patent application Ser. No. 09/344,094, filed Jun. 25, 1999, now U.S. Pat. No. 6,354,147; U.S. patent application Ser. No. 10/795,111, filed Mar. 4, 2004; U.S. patent application Ser. No. 09/997,221, filed Nov. 28, 2001, now U.S. Pat. No. 6,587,798; U.S. patent application Ser. No. 10/007,749, filed Nov. 7, 2001, and U.S. patent application Ser. No. 10/762,410, filed Jan. 21, 2004, each of which are incorporated herein by reference.

While the sonar-based flow meter using an array of sensors to measure the speed of sound of an acoustic wave propagating through the mixture is shown and described, one will appreciate that any means for measuring the speed of sound of the acoustic wave may used to determine the entrained gas volume fraction of the mixture/fluid or other characteristics of the flow described hereinbefore.

The analyzer 64 of the acoustic processing unit 53 provides output signals indicative of characteristics of the process flow 12 that are related to the measured speed of sound (SOS) propagating through the flow 12. For example, to determine the gas volume fraction (or phase fraction), the analyzer 64 assumes a nearly isothermal condition for the flow 12. As such the gas volume fraction or the void fraction is related to the speed of sound by the following quadratic equation:

$$Ax^2+Bx+C=0$$

wherein x is the speed of sound, $A=1+rg/rl*(K_{eff}/P-1)-K_{eff}/P$, $B=K_{eff}/P-2+rg/rl$; $K_{eff}/rl*a_{meas}^2$); Rg=gas density, rl=liquid density, $K_{eff}$=effective K (modulus of the liquid and pipewall), P=pressure, and $a_{meas}$=measured speed of sound.

Effectively, $$\text{Gas Voulume Fraction } (GVF)=(-B+sqrt(B^2-4*A*C))/(2*A)$$

Alternatively, the sound speed of a mixture can be related to volumetric phase fraction ($\phi_i$) of the components and the sound speed (a) and densities ($\rho$) of the component through the Wood equation.

$$\frac{1}{\rho_{mix}a_{mix\infty}^2} = \sum_{i=1}^{N}\frac{\phi_i}{\rho_i a_i^2} \text{ where } \rho_{mix} = \sum_{i=1}^{N}\rho_i\phi_i$$

One dimensional compression waves propagating within a mixture 12 contained within a pipe 14 exert an unsteady internal pressure loading on the pipe. The degree to which the pipe displaces as a result of the unsteady pressure loading influences the speed of propagation of the compression wave. The relationship among the infinite domain speed of sound and density of a mixture; the elastic modulus (E), thickness (t), and radius (R) of a vacuum-backed cylindrical conduit; and the effective propagation velocity ($a_{eff}$) for one dimensional compression is given by the following expression:

$$a_{eff} = \frac{1}{\sqrt{1/a_{mix\infty}^2 + \rho_{mix}\frac{2R}{Et}}} \quad (eq\ 1)$$

Figure 14:
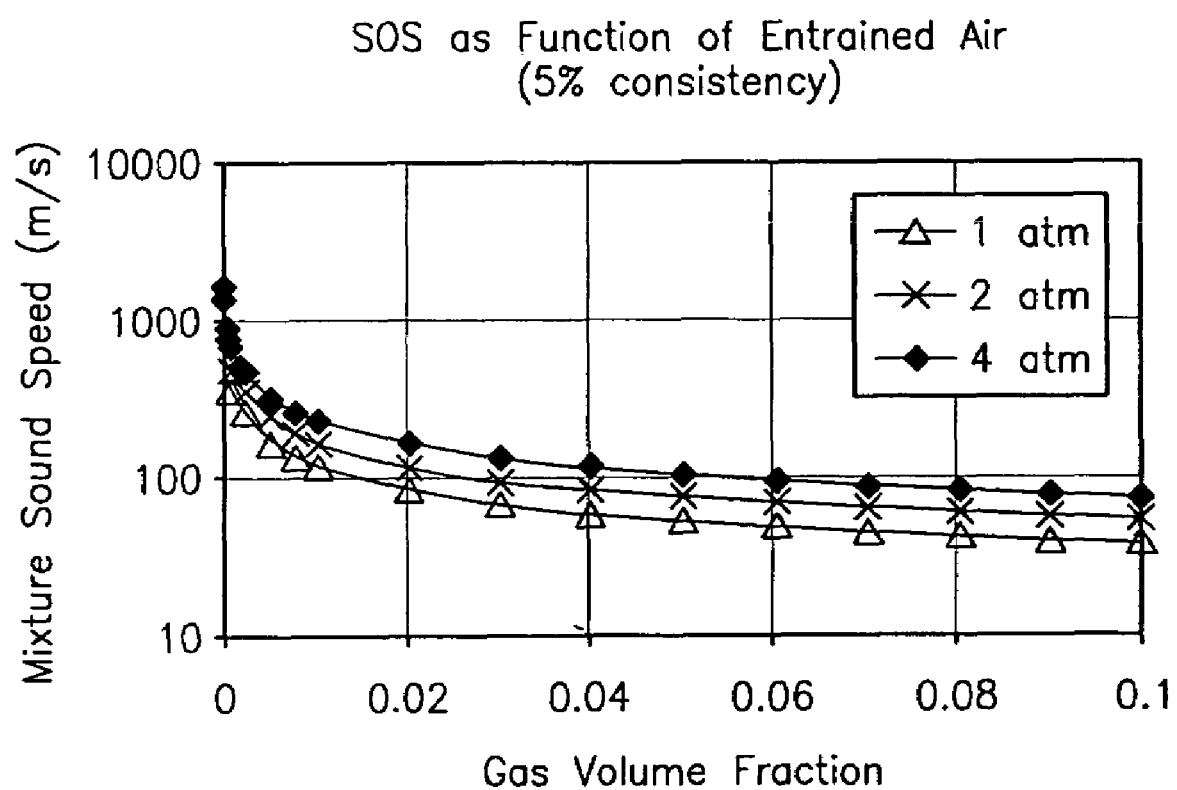
FIG. 14 is a plot of mixture sound speed as a function of gas volume fraction for a 5% consistency slurry over a range of process pressures, in accordance with the present invention.

The mixing rule essentially states that the compressibility of a mixture $(1/(\rho a^2))$ is the volumetrically-weighted average of the compressibilities of the components. For gas/liquid mixtures 12 at pressure and temperatures typical of paper and pulp industry, the compressibility of gas phase is orders of magnitudes greater than that of the liquid. Thus, the compressibility of the gas phase and the density of the liquid phase primarily determine mixture sound speed, and as such, it is necessary to have a good estimate of process pressure to interpret mixture sound speed in terms of volumetric fraction of entrained gas. The effect of process pressure on the relationship between sound speed and entrained air volume fraction is shown in FIG. 14.

As described hereinbefore, the apparatus 10 of the present invention includes the ability to accurately determine the average particle size of a particle/air or droplet/air mixture within the pipe 14 and the air to particle ratio. Provided there is no appreciable slip between the air and the solid coal particle, the propagation of one dimensional sound wave through multiphase mixtures is influenced by the effective mass and the effective compressibility of the mixture. For an air transport system, the degree to which the no-slip assumption applies is a strong function of particle size and frequency. In the limit of small particles and low frequency, the no-slip assumption is valid. As the size of the particles increases and the frequency of the sound waves increase, the non-slip assumption becomes increasing less valid. For a given average particle size, the increase in slip with frequency causes dispersion, or, in other words, the sound speed of the mixture to change with frequency. With appropriate calibration the dispersive characteristic of a mixture 12 will provide a measurement of the average particle size, as well as, the air to particle ratio (particle/fluid ratio) of the mixture.

In accordance with the present invention the dispersive nature of the system utilizes a first principles model of the interaction between the air and particles. This model is viewed as being representative of a class of models that seek to account for dispersive effects. Other models could be used to account for dispersive effects without altering the intent of this disclosure (for example, see the paper titled "Viscous Attenuation of Acoustic Waves in Suspensions" by R. L. Gibson, Jr. and M. N. Toksöz), which is incorporated herein by reference. The model allows for slip between the local velocity of the continuous fluid phase and that of the particles.

The following relation can be derived for the dispersive behavior of an idealized fluid particle mixture.

$$a_{mix}(\omega) = a_f \sqrt{\frac{1}{1 + \frac{\varphi_p \rho_p}{\rho_f\left(1 + \omega^2 \frac{\rho_p^2 v_p^2}{K^2}\right)}}}$$

In the above relation, the fluid SOS, density ($\rho$) and viscosity ($\phi$) are those of the pure phase fluid, $v_p$ is the volume of individual particles and $\phi_p$ is the volumetric phase fraction of the particles in the mixture.

Figure 15:
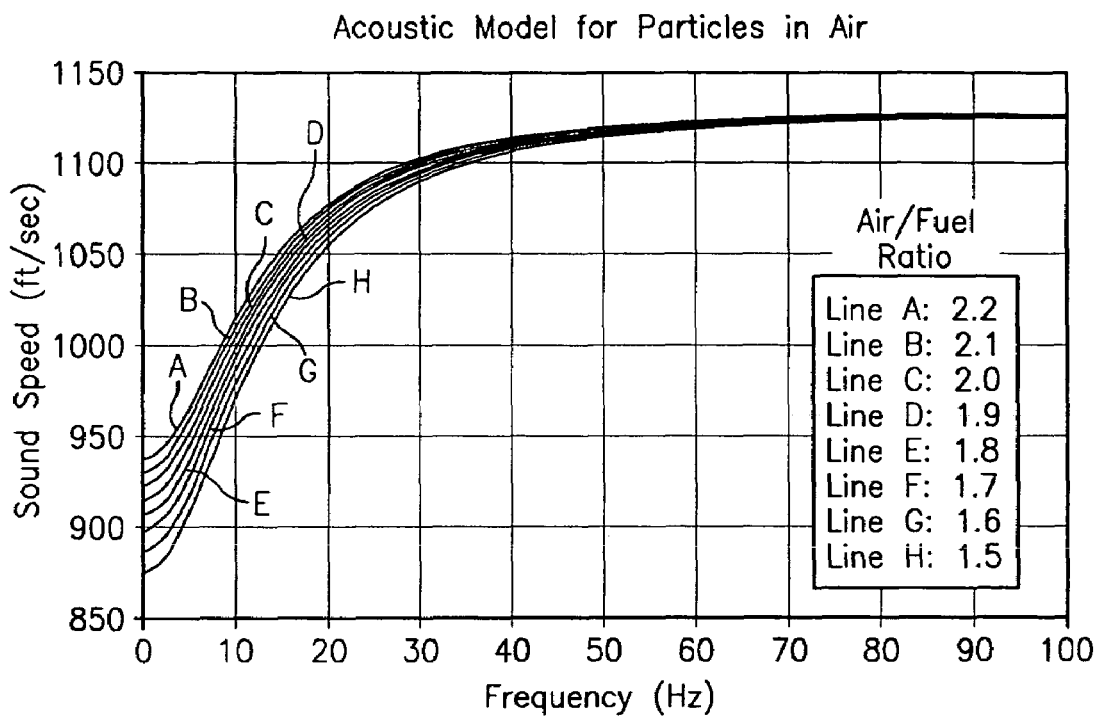
FIG. 15 is a plot of sound speed as a function of frequency for air/particle mixtures with fixed particle size and varying air-to-particle mass ratio in accordance with the present invention.
Figure 16:
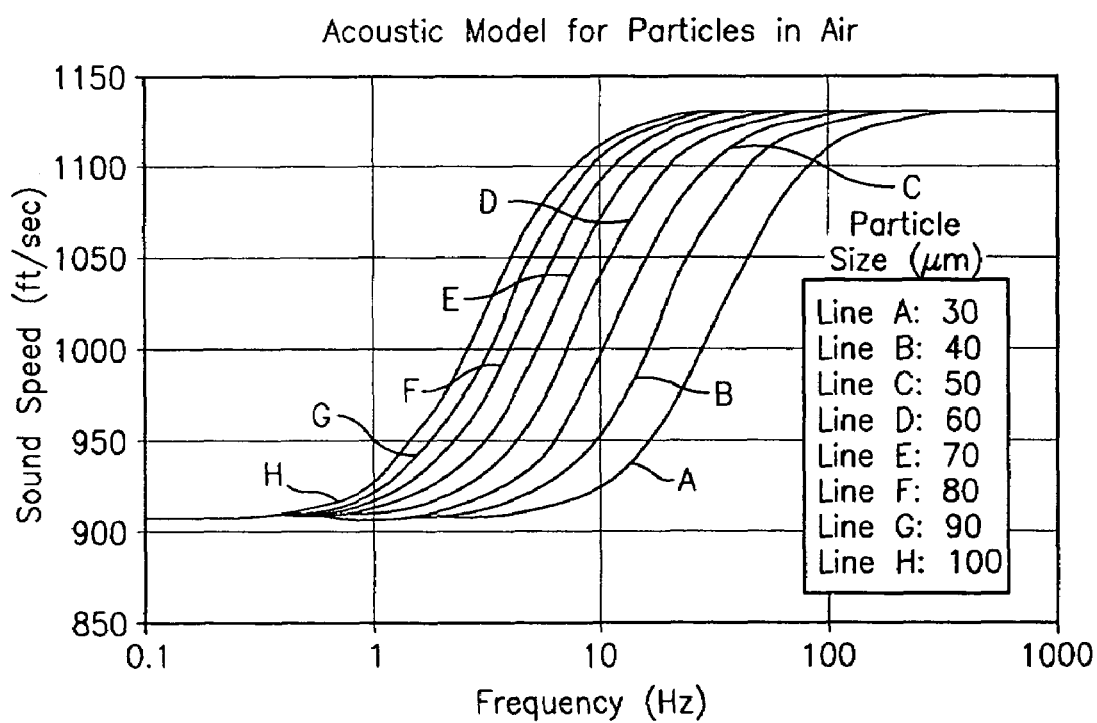
FIG. 16 is a plot of sound speed as a function of frequency for air/particle mixtures with varying particle size where the air-to-particle mass ratio is fixed in accordance with the present invention.

Two parameters of particular interest in steam processes and air-conveyed particles processes are particle size and air-to-fuel mass ratio or steam quality. To this end, it is of interest to examine the dispersive characteristics of the mixture as a function of these two variables. FIGS. 15 and 16 show the dispersive behavior in relations to the speed of sound for coal/air mixtures with parameters typical of those used in pulverized coal deliver systems.

In particular FIG. 15 shows the predicted behavior for nominally 50 μm size coal in air for a range of air-to-fuel ratios. As shown, the effect of air-to-fuel ratio is well defined in the low frequency limit. However, the effect of the air-to-fuel ratio becomes indistinguishable at higher frequencies, approaching the sound speed of the pure air at high frequencies (above ~100 Hz).

Similarly, FIG. 16 shows the predicted behavior for a coal/air mixture with an air-to-fuel ratio of 1.8 with varying particle size. This figure illustrates that particle size has no influence on either the low frequency limit (quasi-steady) sound speed, or on the high frequency limit of the sound speed. However, particle size does have a pronounced effect in the transition region.

FIGS. 15 and 16 illustrate an important aspect of the present invention. Namely, that the dispersive properties of dilute mixtures of particles suspended in a continuous fluid can be broadly classified into three frequency regimes: low frequency range, high frequency range and a transitional frequency range. Although the effect of particle size and air-to-fuel ratio are inter-related, the predominant effect of air-to-fuel ratio is to determine the low frequency limit of the sound speed to be measured and the predominate effect of particle size is to determine the frequency range of the transitional regions. As particle size increases, the frequency at which the dispersive properties appear decreases. For typical pulverized coal applications, this transitional region begins at fairly low frequencies, ~2 Hz for 50 μm size particles.

Given the difficulties measuring sufficiently low frequencies to apply the quasi-steady model and recognizing that the high frequency sound speed contains no direct information on either particle size or air-to-fuel ratio, it becomes apparent that the dispersive characteristics of the coal/air mixture should be utilized to determine particle size and air-to-fuel ratio based on speed of sound measurements.

Some or all of the functions within the processing unit 24 may be implemented in software (using a microprocessor or computer) and/or firmware, or may be implemented using analog and/or digital hardware, having sufficient memory, interfaces, and capacity to perform the functions described herein.

While data acquisition units 40,54, FFT logic 42,56, data accumulators 44,58, array processors 46,60 and ridge identifiers 48, 62 are shown as separate elements or separate software/processing routines, one will appreciate that each of these elements may be common and able to process the data associated with both the pressure signals associated with the speed of sound and the pressures that convect with the procees flow.

Figure 8:
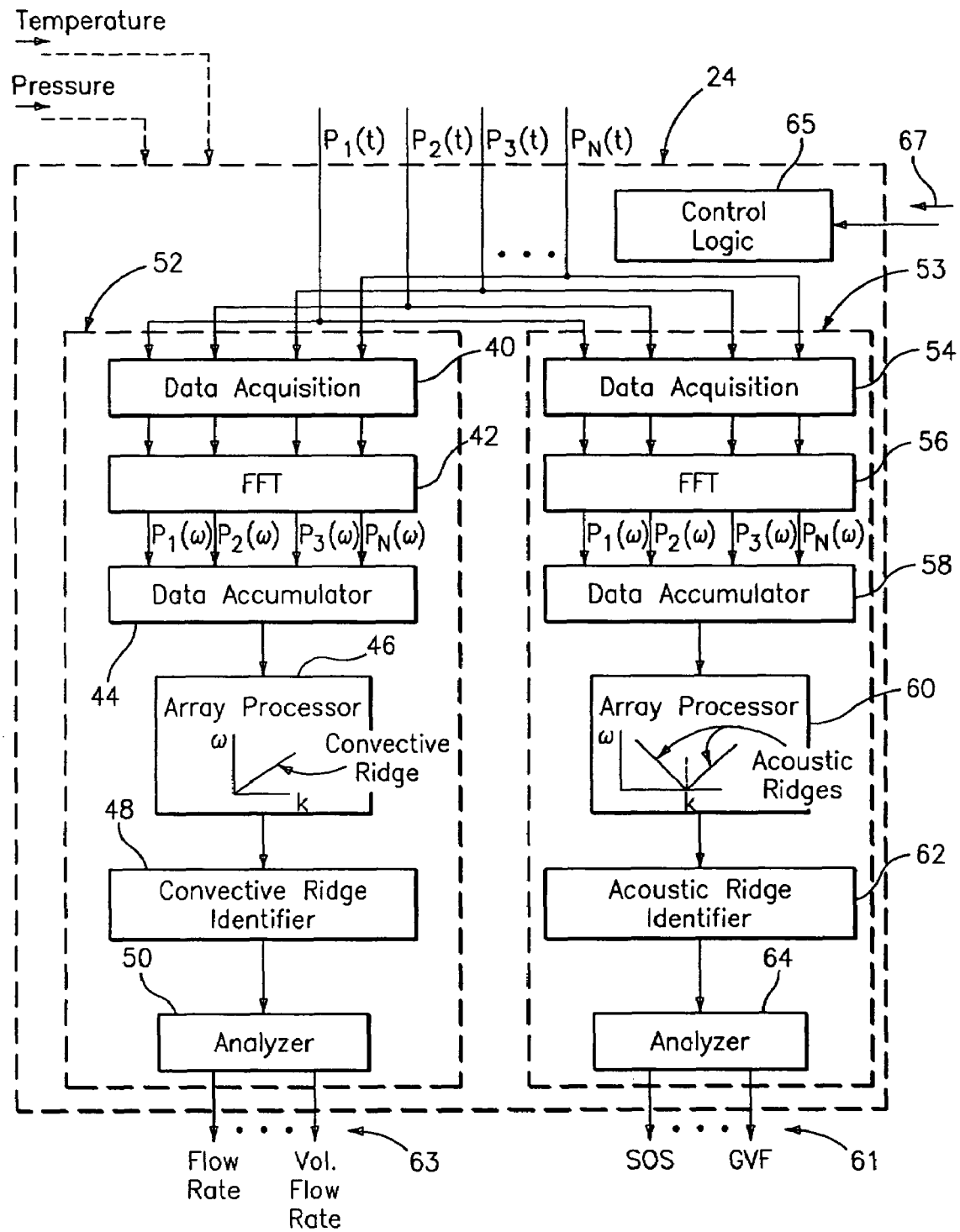
FIG. 8 is a schematic diagram of another embodiment of a processing unit for providing a dual function using parallel processing in accordance with the present invention.
Figure 9:
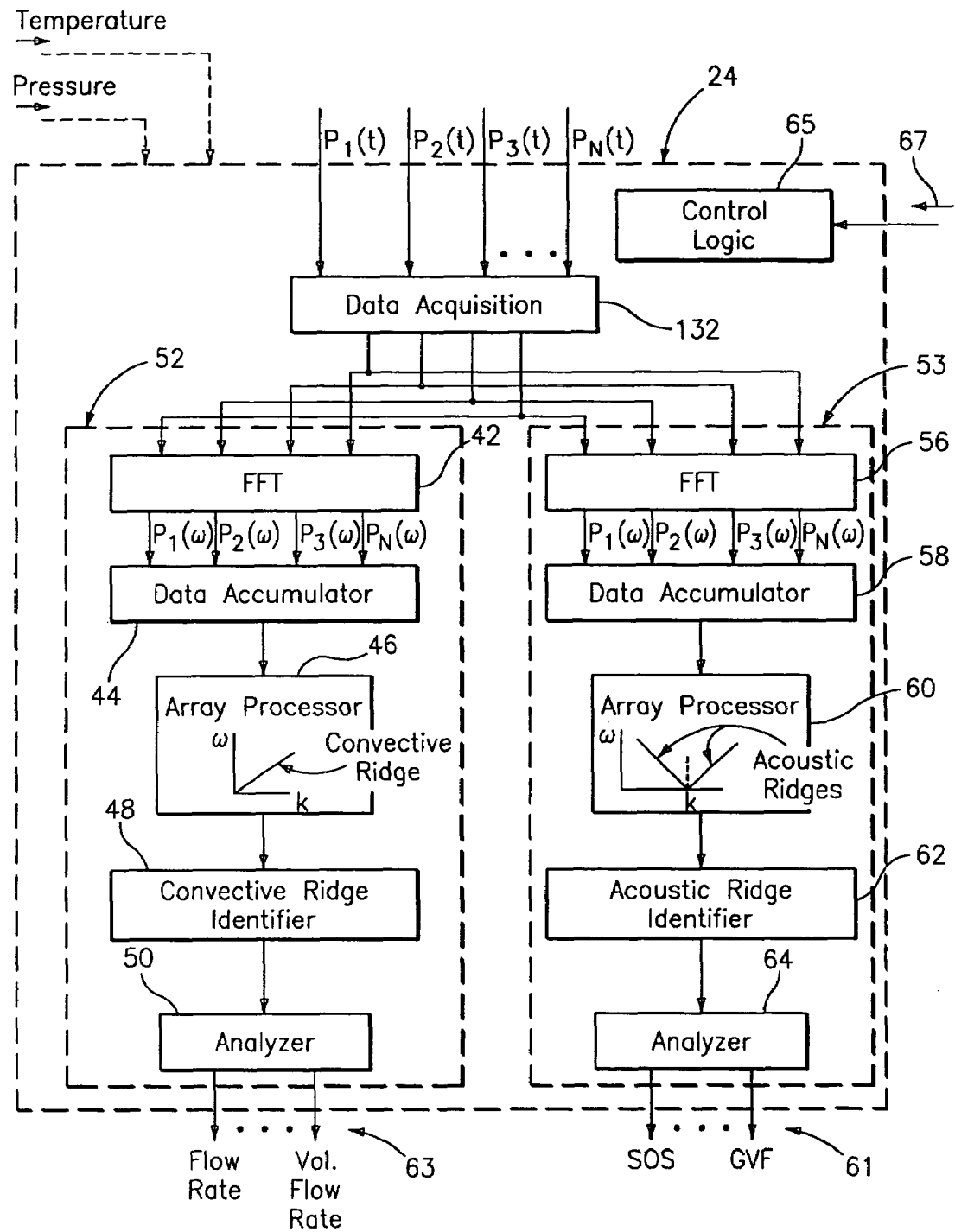
FIG. 9 is a schematic diagram of another embodiment of a processing unit for providing a dual function using parallel processing in accordance with the present invention.
Figure 10:
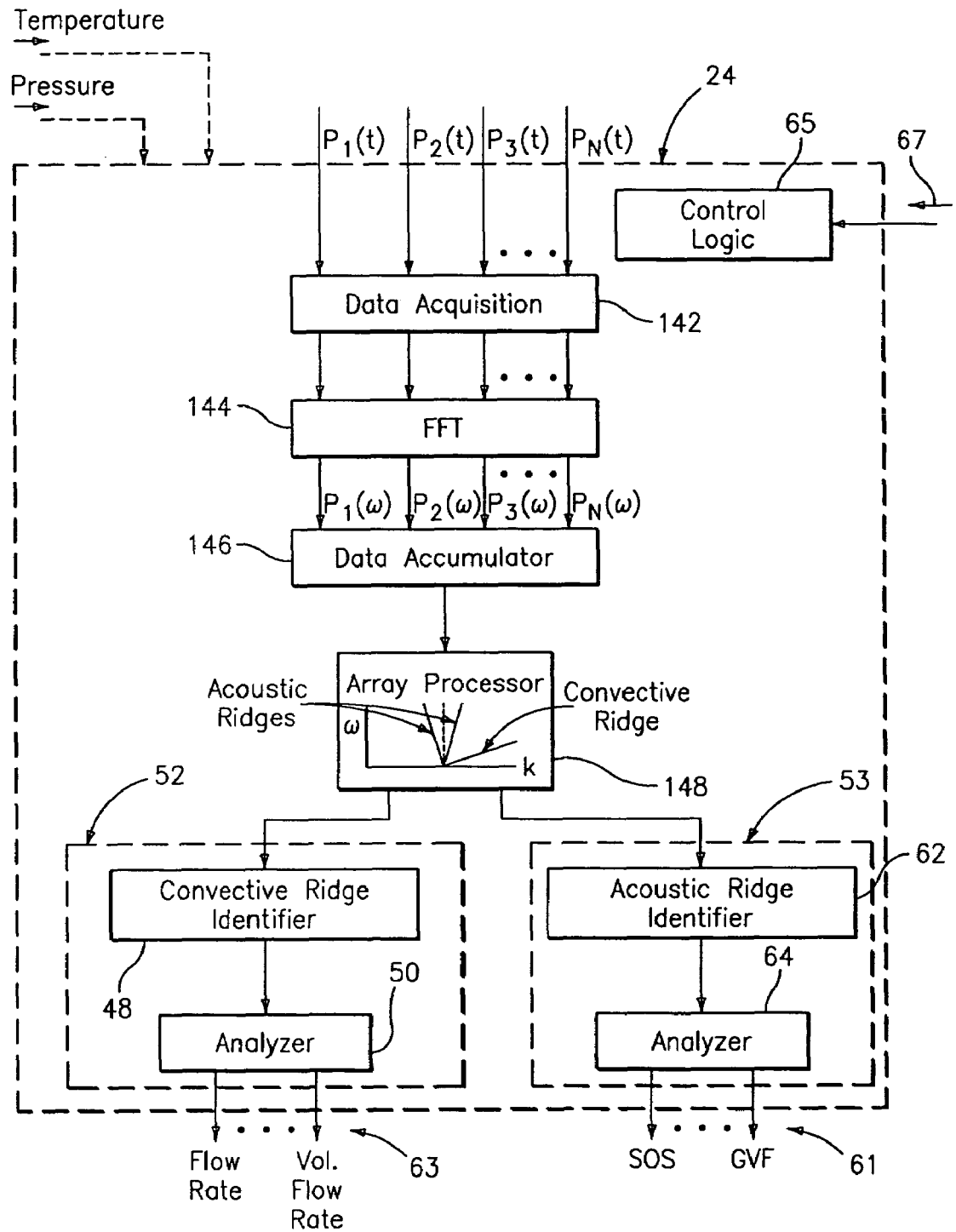
FIG. 10 is a schematic diagram of another embodiment of a processing unit for providing a dual function using parallel processing in accordance with the present invention.

FIGS. 8-10 show an apparatus 120,130,140 embodying the present invention processes the pressure signals P1(t)-PN(t) from the sensing device 16 in parallel to provide both an output signal(s) 63 in response to pressure disturbances 88 that convective with the flow 12 and an output signal(s) 61 in response to pressure disturbances created by acoustic waves 90 propagating through the flow. In FIG. 8, the processing unit 24 includes independent data acquisition and processing of the pressure signals to enable the processing unit 24 multitask. This method is similar to the full serial processing method described hereinbefore in FIG. 7, wherein the difference is the multitasking architecture of the processing unit 24 is used to process independent calculations simultaneously. This method of processing may be inefficient, however, produces fast updates rates of the output signals. One will appreciate that the elements of prior embodiments having the same reference number function substantially the same as that described in other embodiments of the present invention.

FIG. 9 illustrates a processing unit 24 for processing the pressure signals $P_1(t)$-$P_N(t)$ in parallel, wherein the processing unit includes common data acquisition unit 132, but independent calculations of the acquired pressure signals $P_1(t)$-$P_N(t)$. This method utilizes the similarities between the two calculations to employ more efficient architectures. The first primary common component of the two calculations is the pressure signals $P_1(t)$-$P_N(t)$ processed by each flow logic 52,53. By making some adjustments to the accumulated pressure signals, either method to extract the required information may be performed using a single data acquisition step. The calculations still remain independent by the elimination of a common step, which reduces the update time. In this instance, more pressure signals are accumulated than required by the flow rate calculation in order to accommodate the speed of sound calculation.

FIG. 10 shows a processing unit 24 having common data acquisition 142, FFT logic 144, data accumulator 146 and array processor 148 with efficient common algorithm usage and multitasking independent operations. This architecture utilizes the fact that many algorithm components are shared between the two measurements. In this method, common data acquisition is used and as many upfront algorithms are used for both calculations. Examples of common algorithms include the normalization code, the FFT code of the FFT logic, and some of the specific capon algorithms of the array processors. Other portions of the code, such as the convective ridge identifier 48, acoustic ridge identifier 62 and respective analyzers 50,64 are left independent.

While FIGS. 7-10 illustrate the method of processing the pressure signals $P_1(t)$, $P_2(t)$, $P_3(t)$, $P_4(t)$ when both the acoustic and convective flow logic is activate, one will appreciate the processing of each of the convective and acoustic flow logic 52,53 is valid when only one of the flow logics 52,53 is selected by the control logic 65.

Figure 17:
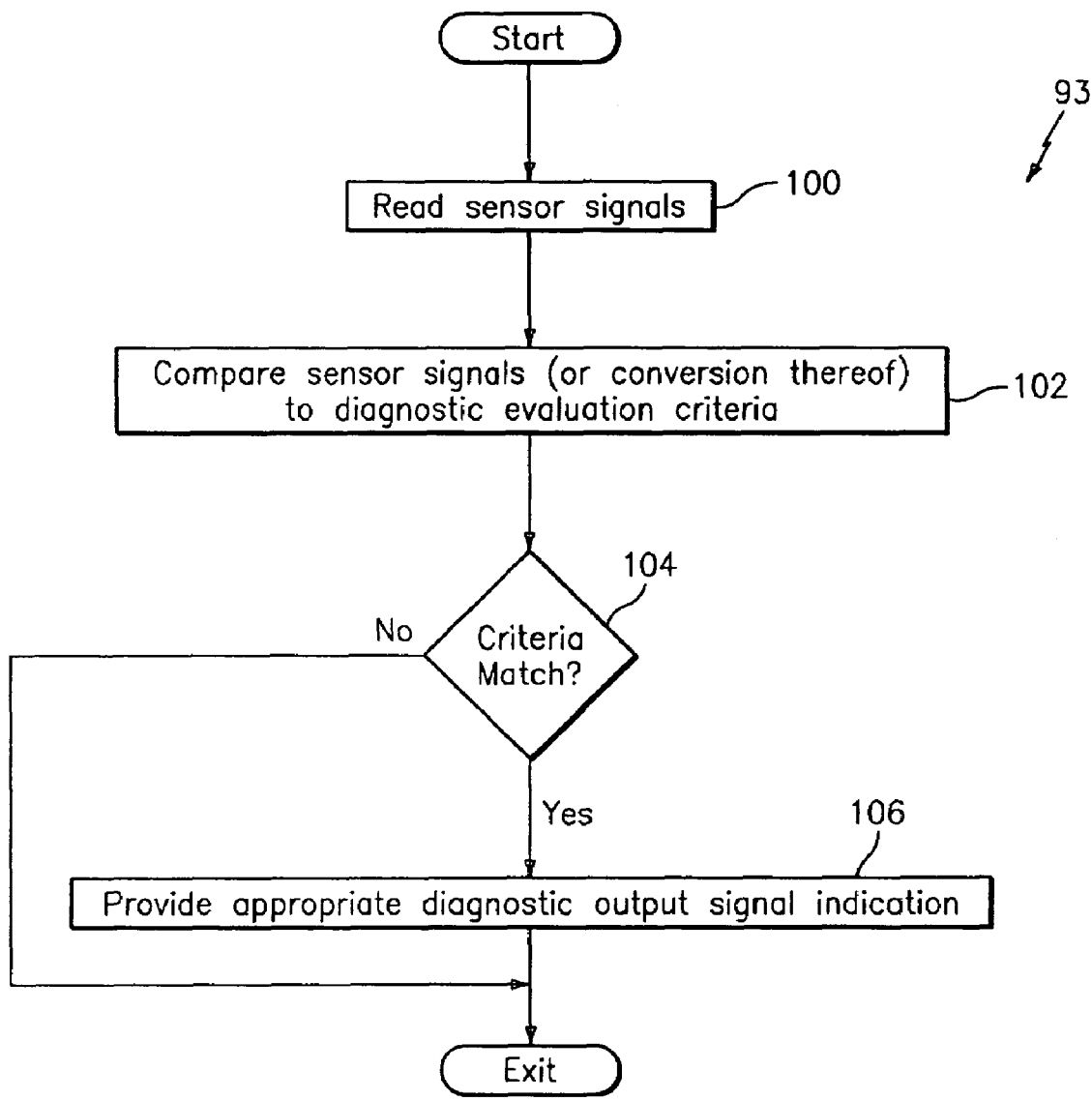
FIG. 17 is a block diagram of a diagnostic flow logic of the diagnostic and flow measurement apparatus of FIG. 4.

Referring to FIG. 17, the diagnostic logic 93 measures the sensor input signals (or evaluation input signals), which may include one or more of the pressure signals $P_1(t)$, $P_2(t)$, $P_3(t)$, $P_4(t)$ and the flow signal 24, at a step 100 (FIG. 17). Next, the diagnostic logic 93 compares the evaluation input signals to a diagnostic evaluation criteria at a step 102, discussed hereinafter. Then, a step 104 checks if there is a match, and if so, a step 106 provides a diagnostic signal 95 indicative of the diagnostic condition that has been detected and may also provide information identifying the diagnosed device. If there is not a criteria match in step 104, the diagnostic logic 93 exits.

Where the evaluation input signal is the flow signal 63, as in the embodiment of FIG. 4 for example, the diagnostic evaluation criteria may be based on a threshold value of the flow signal 63. For example, the threshold value may be indicative of a maximum or minimum sound speed, mach number, consistency, composition, entrained air, density, mass flow rate, volumetric flow rate, or the like.

Where the evaluation input signal includes one or more pressure signals $P_1(t)$, $P_2(t)$, $P_3(t)$, $P_4(t)$, the diagnostic evaluation criteria may be a threshold (maximum or minimum) pressure. Alternatively, the diagnostic evaluation criteria may be based on an acoustic signature, or a convective property (i.e., a property that propagates or convects with the flow). For example, the diagnostic logic 93 may monitor the acoustic signature of any upstream or downstream device (e.g., motor, fan, pump, generator, engine, gear box, belt drive, pulley, hanger, clamp, actuator, valve, meter, or other machinery, equipment or component). Further, the data from the array of sensors 18-21 may be processed in any domain, including the frequency/spatial domain, the temporal/spatial domain, the temporal/wave-number domain, or the wave-number/frequency (k-$\omega$) domain or other domain, or any combination of one or more of the above. As such, any known array processing technique in any of these or other related domains may be used if desired.

For example, for three unsteady pressure signals, the equations in the frequency/spatial domain equation would be: $P(x,\omega) = Ae^{-ik_r x} + Be^{+ik_r x}$; the temporal/spatial domain would be: $P(x,t) = (Ae^{-ik_r x} + Be^{+ik_r x})e^{i\omega t}$; and the k-$\omega$ domain (taking the spatial Fourier transform) would be:

$$P(k,\omega) = \frac{1}{2\pi}\int_{-\infty}^{+\infty} P(x,\omega)e^{ikx}dx = A(\omega)\delta\left(k - \frac{\omega}{a}\right) + B(\omega)\delta\left(k + \frac{\omega}{a}\right)$$

where k is the wave number, a is the speed of sound of the material, x is the location along the pipe, $\omega$ is frequency (in rad/sec, where $\omega = 2\pi f$), and $\delta$ is the Dirac delta function, which shows a spatial/temporal mapping of the acoustic field in the k-$\omega$ plane.

Any technique known in the art for using a spatial (or phased) array of sensors to determine the acoustic or convective fields, beam forming, or other signal processing techniques, may be used to provide an input evaluation signal to be compared to the diagnostic evaluation criteria.

In one embodiment as shown in FIG. 1, each of the pressure sensors 18-21 may include a piezoelectric film 50 attached to a unitary multi-band strap 52 to measure the unsteady pressures of the flow 12 using either technique described hereinbefore. The piezoelectric film sensors 18-21 are mounted onto a unitary substrate or web which is mounted or clamped onto the outer surface 22 of the pipe 14, which will described in greater detail hereinafter.

The piezoelectric film sensors 18-21 include a piezoelectric material or film 50 to generate an electrical signal proportional to the degree that the material is mechanically deformed or stressed. The piezoelectric sensing element 50 is typically conformed to allow complete or nearly complete circumferential measurement of induced strain to provide a circumferential-averaged pressure signal. The sensors can be formed from PVDF films, co-polymer films, or flexible PZT sensors, similar to that described in "Piezo Film Sensors Technical Manual" provided by Measurement Specialties, Inc., which is incorporated herein by reference. A piezoelectric film sensor that may be used for the present invention is part number 1-1002405-0, LDT4-028K, manufactured by Measurement Specialties, Inc. While the piezoelectric film material 50 is provided substantially the length of the band 44, and therefore the circumference of the pipe 14, the present invention contemplates that the piezoelectric film material may be disposed along a portion of the band of any length less than the circumference of the pipe.

Piezoelectric film ("piezofilm") 50, like piezoelectric material, is a dynamic material that develops an electrical charge proportional to a change in mechanical stress. Consequently, the piezoelectric material measures the strain induced within the pipe 14 due to unsteady or stochastic pressure variations (e.g., vortical and/or acoustical) within the process flow 12. Strain within the pipe is transduced to an output voltage or current by the attached piezoelectric sensor 18-21. The piezoelectrical material or film 50 may be formed of a polymer, such as polarized fluoropolymer, polyvinylidene fluoride (PVDF). The piezoelectric film sensors are similar to that described in U.S. patent application Ser. No. 10/712,818 (CiDRA Docket No. CC-0675), filed Nov. 12, 2003 and U.S. patent application Ser. No. 10/795,111 (CiDRA Docket No. CC-0731), filed Mar. 4, 2004, which are incorporated herein by reference. The advantages of this clamp-on technique using piezoelectric film include non-intrusive flow rate measurements, low cost, measurement technique requires no excitation source. One will appreciate that the sensor may be installed or mounted to the pipe 14 as individual sensors or all the sensors mounted as a single unit as shown in FIG. 1.

The pressure sensors 18-21 of FIG. 1 described herein may be any type of sensor, capable of measuring the unsteady (or ac or dynamic) pressures or parameter that convects with the flow within a pipe 14, such as piezoelectric, optical, capacitive, resistive (e.g., Wheatstone bridge), accelerometers (or geophones), velocity measuring devices, displacement measuring devices, ultra-sonic devices, etc. If optical pressure sensors are used, the sensors 18-21 may be Bragg grating based pressure sensors, such as that described in U.S. patent application Ser. No. 08/925,598, entitled "High Sensitivity Fiber Optic Pressure Sensor For Use In Harsh Environments", filed Sep. 8, 1997, now U.S. Pat. No. 6,016,702, and in U.S. patent application Ser. No. 10/224,821, entitled "Non-Intrusive Fiber Optic Pressure Sensor for Measuring Unsteady Pressures within a Pipe", which are incorporated herein by reference. In an embodiment of the present invention that utilizes fiber optics as the pressure sensors 14 they may be connected individually or may be multiplexed along one or more optical fibers using wavelength division multiplexing (WDM), time division multiplexing (TDM), or any other optical multiplexing techniques.

In certain embodiments of the present invention, a piezoelectronic pressure transducer may be used as one or more of the pressure sensors 18-21 and it may measure the unsteady (or dynamic or ac) pressure variations inside the pipe 14 by measuring the pressure levels inside of the pipe. These sensors may be ported within the pipe to make direct contact with the process flow 12. In an embodiment of the present invention, the sensors comprise pressure sensors manufactured by PCB Piezotronics. In one pressure sensor there are integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems.

It is also within the scope of the present invention that any strain sensing technique may be used to measure the variations in strain in the pipe, such as highly sensitive piezoelectric, electronic or electric, strain gages and piezo-resistive strain gages attached to the pipe 12. Other strain gages include resistive foil type gages having a race track configuration similar to that disclosed U.S. patent application Ser. No. 09/344,094, filed Jun. 25, 1999, now U.S. Pat. No. 6,354,147, which is incorporated herein by reference. The invention also contemplates strain gages being disposed about a predetermined portion of the circumference of pipe 12. The axial placement of and separation distance $\Delta X_1$, $\Delta X_2$ between the strain sensors are determined as described herein above.

It is also within the scope of the present invention that any other strain sensing technique may be used to measure the variations in strain in the pipe, such as highly sensitive piezoelectric, electronic or electric, strain gages attached to or embedded in the pipe 14.

While the description has described the apparatus as two separate meters that measure the vortical disturbances and the speed of sound, respectively, as suggested by FIG. 1, the processing could function as two separate meters, a combination (simultaneous operation) of both function, or selectively chose between operations.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. An apparatus for measuring at least one parameter of a process flow flowing within a pipe, the apparatus comprising:

at least two strain sensors disposed at different axial locations along the pipe, each of the strain sensors providing a respective pressure signal indicative of a pressure disturbance within the pipe at a corresponding axial position; and a signal processor, responsive to said pressure signals, which selectively provides one of a first signal related to a velocity of a pressure field moving with the process flow and a second signal related to a speed of sound propagating through the process flow or both in response to a configuration signal.

2. The apparatus of claim 1, wherein the processing unit includes a convective flow logic that determines the first signal and an acoustic flow logic that determines the second signal.

3. The apparatus of claim 2, wherein the convective flow logic includes an array processor that determines power in the k-ω plane.

4. The apparatus of claim 2, wherein the acoustic flow logic includes an array processor that determines power in the k-ω plane.

5. The apparatus of claim 2, wherein the convective flow logic includes a convective ridge identifier that determines the convective ridge in the k-ω plane.

6. The apparatus of claim 2, wherein the acoustic flow logic includes an acoustic ridge identifier that determines the acoustic ridge in the k-ω plane.

7. The apparatus of claim 2, wherein the convective flow logic includes a first analyzer that determines a slope of the convective ridge to determine one of the velocity, the mach number, and volumetric flow rate of the process flow.

8. The apparatus of claim 2, wherein the acoustic flow logic includes a second analyzer that determines a slope of the acoustic ridge, to determine one of steam quality or "wetness", vapor/mass ratio, liquid/solid ratio, volumetric flow rate, mass flow rate, average size of suspended particles, density, gas volume fraction, and enthalpy of the flow.

9. The apparatus of claim 1, wherein the process flow is one of a single phase fluid and a multi-phase mixture.

10. The apparatus of claim 1, wherein the pressure signals are indication of acoustic pressures propagating within the flow and unsteady pressures convecting with the flow.

11. The apparatus of claim 10, wherein the unsteady pressures convecting with the flow are indication of vortical disturbances within the flow.

12. The apparatus of claim 1, wherein the signal processor determines the slope of at least one acoustic ridge in the k-ω plane to determine the speed of sound propagating through the flow, and the slope of a convective ridge in the k-ω plane to determine the velocity of the flow.

13. The apparatus of claim 1, wherein the at least two strain sensors include one of 3, 4, 5, 6, 7, 8, 9, 10, 11, 12, 13, 14, 15, 16, 17, 18, 19 and 20 pressure sensors.

14. The apparatus of claim 2, further including a control logic that selectively provides a control signal which activates or deactivates each of the convective flow logic and acoustic flow logic in response to the configuration signal.

15. The apparatus of claim 2, further including a control logic that selectively provides at least one output signal of at least one of the convective flow logic and acoustic flow logic in response to the configuration signal.

16. The apparatus of claim 1, wherein the signal processor selectively provides a diagnostic signal indicative of the health of process flow loop in response to a configuration signal.

17. The apparatus of claim 16, wherein the signal processor includes a diagnostic logic that determines the diagnostic signal.

18. The apparatus of claim 16, wherein the signal processor compares an input evaluation signal based on the pressure signal against a diagnostic criteria to determine the diagnostic signal.

19. The apparatus of claim 18, wherein the diagnostic criteria is based on a signature in at least one of the frequency domain, time domain, spatial domain, wavenumber, and k-ω domain.

20. The apparatus of claim 18, wherein the evaluation signal is an acoustic signature within the process flow.

21. The apparatus of claim 20, wherein the acoustic signature includes the acoustic signature of a mechanical device of the process flow loop.

22. The apparatus of claim 1, wherein the strain sensors include pressure sensors.

23. The apparatus of claim 1, wherein the second signal is indicative of acoustic pressures propagating axially in one-dimensional through the process fluid.

24. A method of measuring at least one parameter of a process flow flowing within a pipe, the method comprising:
providing respective pressure signals of a pressure disturbance at different axial locations along the pipe; and
processing said respective pressure signals and selectively providing one of velocity of a pressure field moving with the process flow and a speed of sound propagating through the process flow or both in response to a configuration signal.

25. The method of claim 24, wherein the processing includes array processing of the pressure signals to determine power in the k-ω plane.

26. The method of claim 25, wherein the processing includes determining the convective ridge in the k-ω plane.

27. The method of claim 25, wherein the processing includes determining the acoustic ridge in the k-ω plane.

28. The method of claim 26, wherein the processing includes determining a slope of the convective ridge to determine one of the velocity, the mach number, and volumetric flow rate of the process flow.

29. The method of claim 27, wherein the processing includes determining a slope of the acoustic ridge to determine one of steam quality or "wetness", vapor/mass ratio, liquid/solid ratio, volumetric flow rate, mass flow rate, average size of suspended particles, density, gas volume fraction, and enthalpy of the flow.

30. The method of claim 24, wherein the process flow is one of a single phase fluid and a multi-phase mixture.

31. The method of claim 24, wherein the pressure signals are indication of acoustic pressures propagating within the flow and unsteady pressures convecting with the flow.

32. The method of claim 31, wherein the unsteady pressures convecting with the flow are indication of vortical disturbances within the flow.

33. The method of claim 24, wherein the processing includes determining the slope of at least one acoustic ridge in the k-ω plane to determine the speed of sound propagating through the flow, and the slope of a convective ridge in the k-ω plane to determine the velocity of the flow.

34. The method of claim 24, wherein the respective pressure signals are provided at at least 3, 4, 5, 6, 7, 8, 9, 10, 11, 12, 13, 14, 15, 16, 17, 18, 19 and 20 axial locations along the pipe.

35. The method of claim 24, wherein the processing includes selectively providing a control signal which activates or deactivates each of convective array processing and acoustic array processing in response to the configuration signal.

36. The method of claim 24, further providing at least one output related to at least one of the velocity and speed of sound in response to the configuration signal.

37. The method of claim 24, wherein the processing selectively provides a diagnostic metric indicative of the health of a process flow loop in response to a configuration signal.

38. The method of claim 37, wherein the processing includes comparing an input evaluation signal based on the pressure signal against a diagnostic criteria to determine the diagnostic metric.

39. The method of claim 38, wherein the diagnostic criteria is based on a signature in at least one of the frequency domain, time domain, spatial domain, wavenumber, and k-ω domain.

40. The method of claim 38, wherein the evaluation signal is an acoustic signature within the process flow.

41. The method of claim 40, wherein the acoustic signature includes the acoustic signature of a mechanical device of the process flow loop.

42. The method of claim 24, wherein the speed of sound is indicative of acoustic pressures propagating axially in one-dimensional through the process fluid.

* * * * *